(12) United States Patent
Sur et al.

(10) Patent No.: US 12,554,531 B2
(45) Date of Patent: Feb. 17, 2026

(54) IMPROVING PROCESSOR UTILIZATION

(71) Applicant: MELLANOX TECHNOLOGIES, LTD., Yokneam (IL)

(72) Inventors: Sayantan Sur, Cary, NC (US); Shahaf Shuler, Kibbutz Lohamei HaGetaot (IL); Doron Haim, Herzliya (IL); Netanel Moshe Gonen, Kokhav Yair (IL); Stephen Anthony Bernard Jones, San Francisco, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 657 days.

(21) Appl. No.: 17/971,986

(22) Filed: Oct. 24, 2022

(65) Prior Publication Data

US 2024/0134681 A1 Apr. 25, 2024
US 2024/0231888 A9 Jul. 11, 2024

(51) Int. Cl.
*G06F 9/48* (2006.01)

(52) U.S. Cl.
CPC .................................. *G06F 9/4825* (2013.01)

(58) Field of Classification Search
None
See application file for complete search history.

(56) References Cited

U.S. PATENT DOCUMENTS

| | | | |
|---|---|---|---|
| 2016/0378712 A1* | 12/2016 | Amit | G06F 9/546 709/212 |
| 2017/0060641 A1* | 3/2017 | Ramaswamy | G06F 9/5038 |
| 2020/0004587 A1* | 1/2020 | Griffin | G06F 9/4856 |
| 2020/0264911 A1* | 8/2020 | Raisch | G06F 9/4881 |
| 2021/0279097 A1* | 9/2021 | Vijay | G06F 9/4881 |
| 2023/0035142 A1* | 2/2023 | Macnamara | G06F 9/505 |
| 2023/0134657 A1* | 5/2023 | Kumar | G06F 9/45558 710/260 |

OTHER PUBLICATIONS

"Yielding the processor to another thread," IBM Corporation, last updated Jul. 23, 2021, 1 page [retrieved online from: www.ibm.com/docs/en/i/7.4?topic=management-yielding-processor-another-thread].

Di Girolamo et al. "A RISC-V in-network accelerator for flexible high-performance low-power packet processing," IEEE, 2021 ACM/IEEE 48th Annual International Symposium on Computer Architecture (ISCA), 2021, pp. 958-971.

Hoefler et al. "sPIN: High-performance streaming Processing in the Network," Proceedings of the International Conference for High Performance Computing, Networking, Storage and Analysis, Nov. 2017, Article No. 59, 20 pages.

Ibanez et al. "The nanoPU: A Nanosecond Network Stack for Datacenters," Proceedings of the 156h USENIX Symposium on Operating Systems Design and Implementation, Jul. 14-16, 2021, pp. 239-256.

\* cited by examiner

*Primary Examiner* — S. Sough
*Assistant Examiner* — Selena Sabah Nahra
(74) *Attorney, Agent, or Firm* — Sheridan Ross P.C.

(57) ABSTRACT

Techniques described herein include managing scheduling of interrupts by receiving a data packet comprising an indication of an interrupt to be delivered, determining an availability status of a processing thread, and managing an interrupt status indicator in response to determining the availability status. A value of the interrupt status indicator corresponds to a quantity of pending interrupts. An event handling circuit processes the interrupt or one or more pending interrupts using the processing thread.

22 Claims, 17 Drawing Sheets

IMPROVING PROCESSOR UTILIZATION

FIELD OF TECHNOLOGY

The present disclosure relates to processor utilization, and more particularly, to techniques for improving processor utilization in a cooperatively scheduled environment.

BACKGROUND

Some platforms may implement a programmable data plane that supports event handlers from multiple processes, users, and virtual machines. Improved techniques for optimizing associated overheads and overall throughput are desired.

SUMMARY

The described techniques relate to improved methods, systems, devices, and apparatuses that support processor utilization in an event-driven cooperatively scheduled environment.

Example aspects of the present disclosure include:

An apparatus including one or more circuits to manage scheduling of interrupts by: receiving a data packet including an indication of an interrupt to be delivered; determining an availability status of a processing thread; and managing an interrupt status indicator in response to determining the availability status, wherein a value of the interrupt status indicator corresponds to a quantity of pending interrupts.

Any of the aspects herein, wherein managing the interrupt status indicator includes: increasing the value of the interrupt status indicator in response to the availability status indicating the processing thread is unavailable.

Any of the aspects herein, wherein the one or more circuits are further to: store the interrupt to a memory buffer including the pending interrupts in response to the availability status indicating the processing thread is unavailable.

Any of the aspects herein, wherein the one or more circuits are further to: deliver the interrupt to the processing thread in response to the availability status indicating the processing thread is available; and configure one or more parameters associated with an event handling circuit and the processing thread in association with processing the interrupt.

Any of the aspects herein, wherein the one or more circuits are further to: receive an indication of an availability status of the processing thread in association with processing one or more other interrupts; and identify, from among the pending interrupts, a pending interrupt assigned to the processing thread, wherein managing the interrupt status indicator includes decreasing the value of the interrupt status indicator in response to identifying the pending interrupt.

Any of the aspects herein, wherein the one or more circuits are further to, in response to identifying the pending interrupt: deliver the pending interrupt to the processing thread; and configure one or more parameters associated with an event handling circuit and the processing thread in association with processing the pending interrupt.

Any of the aspects herein, wherein the one or more circuits are further to: receive an indication of an availability status of the processing thread in association with processing one or more other interrupts; identify, from among the pending interrupts, a pending interrupt assigned to a group of processing threads that includes the processing thread; and selecting, from among the group of processing threads: the processing thread; or another processing thread, wherein managing the interrupt status indicator includes decreasing the value of the interrupt status indicator in response to selecting the processing thread or the other processing thread.

Any of the aspects herein, wherein the one or more circuits are further to: transmit data to an event handling circuit in response to a query from the event handling circuit, wherein the data includes an indication of an existence or absence of the pending interrupts.

Any of the aspects herein, wherein the one or more circuits are further to: process the interrupt using the processing thread; transmit a query requesting an indication of an existence or absence of one or more additional interrupts; and release ownership of the processing thread in response to a result of the query.

Any of the aspects herein, wherein the one or more circuits are further to: process the interrupt using the processing thread; transmit a query requesting an indication of an existence or absence of one or more additional interrupts; poll a queue for the one or more additional interrupts, in response to a result of the query; and process the one or more additional interrupts using the processing thread.

Any of the aspects herein, wherein the one or more circuits are further to: compare a quantity of queries to a quantity of pending interrupts with respect to a temporal duration, wherein the queries each include a request for an indication of an existence or absence of the pending interrupts, wherein managing the interrupt status indicator includes decreasing the value of the interrupt status indicator based on a result of the comparison.

Any of the aspects herein, wherein the interrupt status indicator includes a counter.

A system including a hardware scheduling circuit to manage scheduling of interrupts by: receiving a data packet including an indication of an interrupt to be delivered; determining an availability status of a processing thread; and managing an interrupt status indicator in response to determining the availability status, wherein a value of the interrupt status indicator corresponds to a quantity of pending interrupts. The system includes an event handling circuit to process, using the processing thread, at least one of: the interrupt; and one or more of the pending interrupts.

Any of the aspects herein, wherein managing the interrupt status indicator includes: increasing the value of the interrupt status indicator, in response to the availability status indicating the processing thread is unavailable.

Any of the aspects herein, wherein the hardware scheduling circuit is further to: stores the interrupt to a memory buffer including the pending interrupts, in response to the availability status indicating the processing thread is unavailable.

Any of the aspects herein, wherein the hardware scheduling circuit is further to: deliver the interrupt to the processing thread, in response to the availability status indicating the processing thread is available; and configure one or more parameters associated with the event handling circuit and the processing thread in association with processing the interrupt.

Any of the aspects herein, wherein the hardware scheduling circuit is further to: receive an indication of an availability status of the processing thread in association with processing one or more other interrupts; and identify, from among the pending interrupts, a pending interrupt assigned to the processing thread, wherein managing the interrupt status indicator includes decreasing the value of the interrupt status indicator in response to identifying the pending interrupt.

Any of the aspects herein, wherein, in response to identifying the pending interrupt, the hardware scheduling circuit is to: deliver the pending interrupt to the processing thread; and configure one or more parameters associated with the event handling circuit and the processing thread in association with processing the pending interrupt.

Any of the aspects herein, wherein the hardware scheduling circuit is further to: transmit data to the event handling circuit in response to a query from the event handling circuit, wherein the data includes an indication of an existence or absence of the pending interrupts.

Any of the aspects herein, wherein the event handling circuit is further to: process the interrupt using the processing thread; transmit a query requesting an indication of an existence or absence of one or more additional interrupts; and release ownership of the processing thread in response to a result of the query.

Any of the aspects herein, wherein the interrupt status indicator includes a counter.

A method including: receiving a data packet including an indication of an interrupt to be delivered; determining an availability status of a processing thread in association with processing the interrupt; and managing an interrupt status indicator and the processing of the interrupt in response to determining the availability status, wherein a value of the interrupt status indicator corresponds to a quantity of pending interrupts.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/implementations in combination with any one or more other aspects/features/implementations.

Use of any one or more of the aspects or features as disclosed herein.

It is to be appreciated that any feature described herein can be claimed in combination with any other feature(s) as described herein, regardless of whether the features come from the same described implementation.

The details of one or more aspects of the disclosure are set forth in the accompanying drawings and the description below. Other features, objects, and advantages of the techniques described in this disclosure will be apparent from the description and drawings, and from the claims.

The preceding is a simplified summary of the disclosure to provide an understanding of some aspects of the disclosure. This summary is neither an extensive nor exhaustive overview of the disclosure and its various aspects, implementations, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, implementations, and configurations of the disclosure are possible utilizing, alone or in combination, one or more of the features set forth above or described in detail below.

Numerous additional features and advantages of the present disclosure will become apparent to those skilled in the art upon consideration of the implementation descriptions provided hereinbelow.

DETAILED DESCRIPTION

Figure 1:
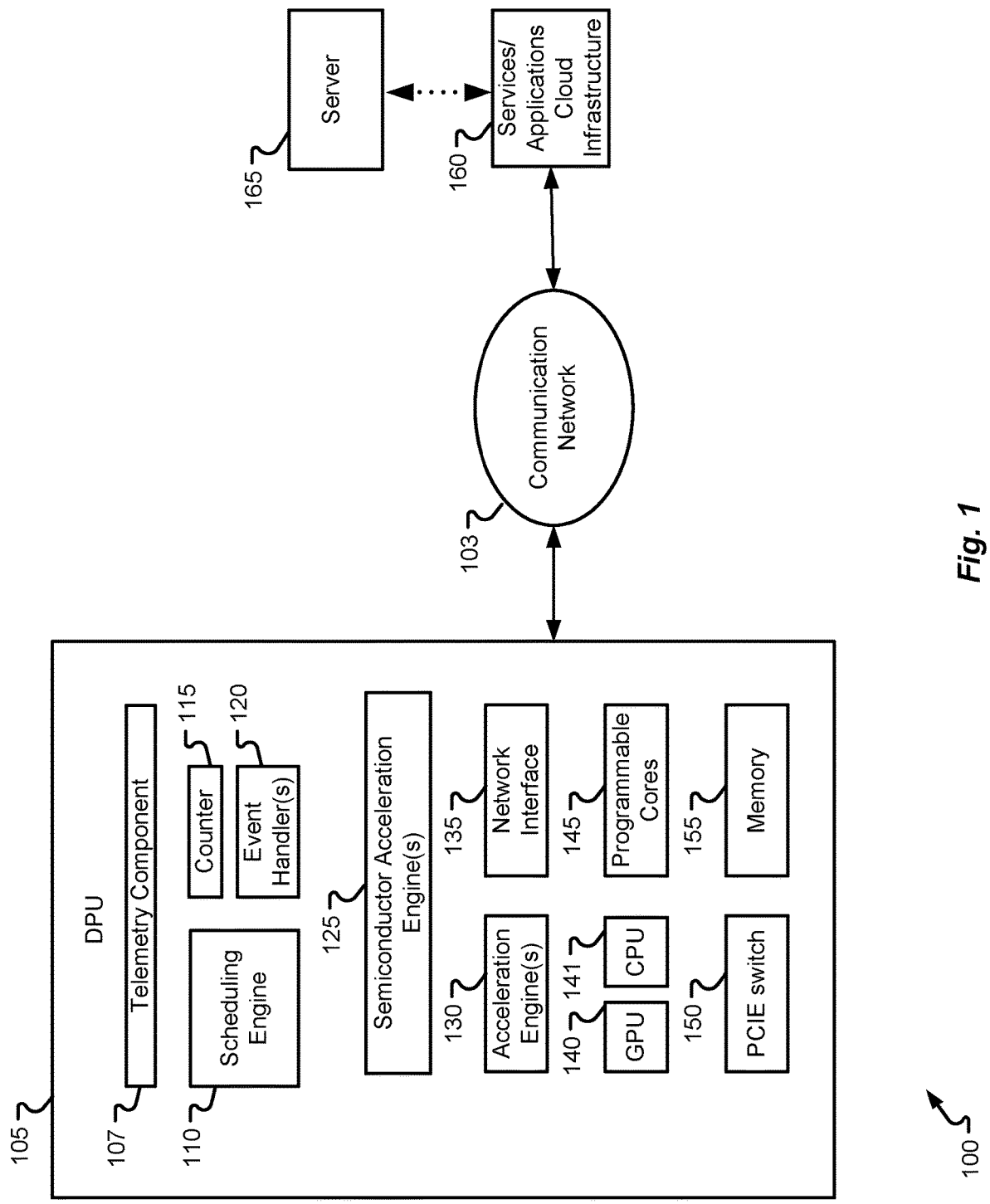
FIG. 1 illustrates an example of a system in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

A programmable network communication data plane (also referred to herein as a "programmable data plane" or a "data plane") may enable accelerated computing in a system environment. For example, user-defined software can process data during flight (e.g., during transmission of the data) or use meta-data within communicated messages to program hardware elements in a NIC (or Smart NIC) and switches.

Programs in the data plane may be expressed in a "match-action" or "event-driven" programming model. Based on the programming model, actions or event handlers are invoked when a match or event occurs. The event handlers (also referred to herein as "handlers," "user handlers," "user mode handlers," "work handlers," or "applications") may be written in a programming language (e.g., a subset of the C programming language or similar), in which the logic within the handler is user defined. In some cases, the event handlers may be completely user defined. Examples of invoking an action or event handler is later described with reference to FIG. 2.

For some user programmable platforms supported by a data path accelerator (DPA), user defined tasks may run in a run-to-completion model and scheduling is cooperative. For example, such implementations may provide the highest possible performance. However, in some cooperatively scheduled system environments, the operating system of the DPA does not preempt any currently running user tasks. In some cases, it is the responsibility of the user handler to periodically "yield" the processor (e.g., yield a utilized processing thread) to the operating system so that the operating system can schedule other tasks using the processor (or yielded processing thread). In some cases, when the user handler yields a processor, overhead is incurred with respect to later rescheduling the user handler for use of the processor, especially for cases in which no other task was ready to run. Accordingly, for example, some user handlers are incentivized to "hog" the processor (e.g., refrain from yielding a processing thread) for the longest duration possible. In some cases, some user handlers may poll the network completion queue looking for new work while refraining from yielding the processor, which may thereby reduce overall system utilization as processor cycles are wasted.

Aspects of the present disclosure support a platform implementing the programmable data plane. The platform may offer services to schedule the user-defined event handlers. The platform may also support many event handlers from multiple processes, users, and virtual machines. For example, in some cases, the platform must offer services to schedule the user-defined event handlers and must support many such event handlers. The platform may be implemented in association with a data center infrastructure-on-a-chip such as a data processing unit (DPU). In some aspects, the platform may be implemented in association with a data path accelerator (DPA) of the DPU.

Aspects of the present disclosure may be implemented in association with an operating system that supports a cooperative scheduling model. In an example, the operating system may be associated with the DPA. In some alternative and/or additional implementations, the operating system may be different and/or separate from the operating system of the DPU. For example, aspects of the present disclosure may be implemented in an x86 operating system, a Linux operating system, or the like.

An example case of a cooperative scheduling model implemented in some operating systems is described herein. After an event occurs, the operating system must configure an environment for an event handler (also referred to herein as a "user defined event handler" or "event handling circuit"), set up the address space associated with the environment, and the like before the event handler can start execution of a work task. The event handler may execute the work task, for example, using a processing thread (a hardware processing thread, called "Hart" in RISC-V terminology). In such an example model, it is up to the event handler to return the processing thread to the operating system once the event handler has completed the work using the processing thread.

The example case of a cooperative scheduling model offers benefits, such as reduced software overhead compared to a pre-emptive scheduling model, which may translate to a higher rate of events processed per second. In some cases, for some DPAs, the latency from an event to its user defined handler execution may be about 1.5 μs (e.g., event handler setup may be equal to about 1.5 μs. Although such latency may be relatively low compared to traditional host networking, cooperative scheduling models implemented in some operating systems still represent a challenge for efficiency, for example, for event handlers that are only hundreds of instructions long. An example of the cooperative scheduling model is later described with reference to Example Approach 1 below and FIG. 8A.

Some cooperatively scheduled systems may support batching techniques that avoid paying the cost of 1.5 μs per event (also referred to herein as "activation overhead"). For example, according to some batching techniques, a handler may poll for additional events (e.g., with a goal of finding more work) while still activated, without returning the processing thread to the operating system until the expiry of a timer. If the handler succeeds at finding additional work while still activated, the handler may avoid costly activation latency. However, such batching techniques may risk wasting cycles in aggregate (e.g., hogging the processing thread), which may prevent other event handlers from otherwise running and using the processing thread. An example of batching in some cooperatively scheduled system is later described with reference to Example Approach 2 below and FIG. 8B.

In a further example of some cooperatively scheduled systems, new work arrives on a DPA via an interrupt when an associated network completion queue receives a completion entry. The interrupt may be serviced by either a chosen processing thread or a group of processing threads. The group of processing threads may offer the hardware scheduler of the DPU an opportunity to select a processing thread (e.g., the chosen processing thread, the group of processing threads, any processing thread of the group of processing threads) with a degree of fairness and load-balanced usage. The choice of which processing thread or group of processing threads to serve the interrupt is coded in the interrupt bits. It is the responsibility of the operating system to provide the mapping. Examples of selecting which processing thread or group of processing threads in some other cooperatively scheduled systems is later described with reference to FIGS. 4A and 4B.

Accordingly, for example, in some cooperatively scheduled systems, problems arise in which a user-defined handler does not know how to effectively yield a processing thread (e.g., return the processing thread to the operating system) so as to minimize its own activation overheads and maximize overall throughput. Techniques are desired for providing knowledge to the user-defined event handler regarding when to yield the processing thread to the operating system, while minimizing activation overheads associated with the handler and maximizing overall throughput.

Some other approaches for minimizing activation overheads and maximizing overall throughput are described herein. Although the other approaches include some benefits, drawbacks associated with the other approaches negate the benefits.

Example Approach 1: Event Handler Returns the Processing Thread to the Operating System as Soon as Work for the Event Handler is Complete Benefit: The operating system can schedule another handler quickly. Drawback: The cost of event handler setup represents a large fraction of overall time, reducing efficiency. In an example, if setup cost is $T_s$, work performed by one event handler is $T_w$, then the efficiency is: $T_w/(T_s+T_w)$ An example process flow illustrating aspects of Example Approach 1 is later described with reference to FIG. 8A.

Example Approach 2: Batching (Also Referred to Herein as Cooperative Batch Scheduling)

An event handler polls the queues, looking for more work before returning a processing thread to the operating system.

If the event handler finds more work, the event handler performs the work before returning the processing thread.

Benefit: The setup cost is amortized between multiple work items. For example, if $T_p$ is the cost of polling once for discovering additional work and n is the number of work items processed, the efficiency is: $n*T_w/(T_s+n*T_p+n*T_w)$. This term starts to approach 1 if n is large (e.g., above a corresponding threshold), and $T_p$ is small (e.g., below a corresponding threshold).

Drawback: The overall efficiency decreases for worst cases in which the handler polls queues for work but no work is found. The worst case is defined when the handler polls for n work items, but finds none. For example, in a worst case scenario, the handler effectively executes only one work item (when the work item was invoked) and is unable find any additional work.

Worst case efficiency: $T_w/(T_s+n*T_p+T_w)$. In the example of worst case efficiency, the longer an event handler polls for additional work, the chances of the event handler wasting cycles increases. That is, for example, even if $T_p$ is small (e.g., below a corresponding threshold), n may be high (e.g., above a corresponding threshold).

An example process flow illustrating aspects of Example Approach 2 is later described with reference to FIG. 8B.

Example Approach 3: Dedicated Threads

An application completely takes over a processing thread, never returning the processing thread to the operating system. Example Approach 3 is a degenerate case of batching described with reference to Example Approach 2.

Benefit: Performance predictability for a given application since the application is in control of the physical resources. Drawback: Example Approach 3 does not scale to cases in which the number of applications and handlers>physical number of threads. Additionally, if the processing threads are not receiving work, the physical thread cycles associated with the processing threads are wasted.

Additional implementations of some systems with respect to network programmability are also described herein. The additional implementations fail to address the problems described herein associated with effectively yielding ownership of a processing thread so as to minimize activation overheads and maximize overall throughput.

Programming Protocol-independent Packet Processors (P4): P4 is a programming model for data plane programming. While it presents the match-action model, it does not specify the low-level action scheduling logic. This is left up to the P4 implementation itself.

Designed Plane Development Kit (DPDK): DPDK is a runtime library and a set of APIs that is used in the packet processing domain. DPDK consists of libraries to accelerate packet processing workloads running on a wide variety of CPU architectures to run on x86, POWER, and ARM processors. DPDK is very Host CPU centric. DPDK accomplishes packet handling via polling akin to Example Approach 3 described herein. That is, a DPDK thread wholly occupies a physical thread.

streaming Processing in the Network (sPIN): sPIN is a research work that explores NIC programmability to implement transport protocols over a reliable L2. sPIN implements a cooperative model. sPIN relies on very tight integration of the processor with the NIC. Although sPIN does not spell it out specifically, sPIN is geared for event handlers that are very short and therefore the system is designed to have extremely low handler activation latency. It is unclear if sPIN could handle a real system with the isolation requirements and ability to assign thousands of handlers. In such a system, it may not be possible for sPIN to achieve negligible activation latency.

nanoPU (a nanosecond network stack for datacenters): nanoPU presents a CPU with very tight integration with NIC. nanoPU offers extremely low activation latency of about 3 ns. However, nanoPU follows the pre-emptive (not cooperative) scheduling model. nanoPU fails to account for the full cost of handler invocation under a context switch. In a pre-emptively scheduling system, the operating system (or hardware (HW)) decides when to suspend a task. The operating system must save the state of the task and decide when the task can be resumed. Use of the pre-emptive model in association with relatively high processing overhead (heavy weight) and can reduce overall performance. However, one benefit in a pre-emptively scheduled system is that the user defined handlers do not have to decide when to return the thread back to the operating system. The handlers have the illusion of infinite occupancy of the processor.

Example aspects supportive of addressing the abovementioned shortcomings are described herein.

According to example aspects of the present disclosure, a hardware scheduling circuit (also referred to herein as a hardware scheduler or scheduling engine) may maintain an interrupt status indicator of pending interrupts. The interrupt status indicator may include, for example, a counter of pending interrupts. The hardware scheduling circuit increments the pending interrupt count when there an interrupt that is buffered (e.g., no processing thread is available for processing the interrupt). A user mode handler may query the hardware scheduling circuit via a doorbell mechanism to identify whether there are any pending interrupts. In some cases, the hardware scheduling circuit may decrement the pending interrupt count after delivering an interrupt to a processing thread. Use of the pending interrupt count and doorbell mechanism (also referred to herein as a doorbell interface) support a low cost, smart yielding mechanism based on which the user mode handler can determine whether to yield (i.e., return) a processing thread to the operating system.

Example aspects of the hardware scheduling circuit maintaining the counter of pending interrupts are later described herein with reference to FIGS. 3A and 3B. Example aspects of the doorbell mechanism are later described herein with reference to FIG. 5. Examples of the hardware scheduling circuit providing an indication of a pending interrupt in response to a query from an event handler is later described herein with reference to FIGS. 6, 9A, and 9B. An example of a user handler utilizing the indication to determine whether to yield a processing thread to the operating system is later described herein with reference to FIG. 7.

Particular aspects of the subject matter described herein may be implemented to realize a pending interrupt hint that is absent from other systems and techniques. For example, maintaining a counter of pending interrupts, using a doorbell mechanism to indicate the presence of pending interrupts, and providing a smart yielding mechanism as described herein may achieve reduced processing latency, reduced processing overhead, improved processing efficiency, improved system utilization, and the like for an operating system (e.g., a cooperatively scheduled system).

Aspects of the hardware scheduling circuit may support implementations in which a user's running task may determine whether other tasks are awaiting scheduling (e.g., check for pending interrupts). If other tasks are awaiting scheduling, the running task may yield use of a processor (e.g., yield a processing thread to the operating system). Additionally, or alternatively, if no other tasks are awaiting scheduling, the running task may continue work and continue to occupy the processor. Accordingly, for example, the features of yielding use of the processor based on whether other tasks are awaiting scheduling may minimize overall wasted cycles, thereby providing added improved features to cooperatively scheduled systems.

Aspects of the disclosure are further illustrated by and described with reference to apparatus diagrams, system diagrams, and flowcharts.

FIG. 1 illustrates an example of a system 100 that supports aspects of the present disclosure. The system 100 may be a cooperatively scheduled system.

The system 100 may include a DPU 105. The DPU 105 may be a system on chip (SOC) device that combines flexible and programmable acceleration engines, a high-performance network interface, and a high-performance and software-programmable multi-core CPU. The DPU 105 may be a data center infrastructure-on-a-chip that enables organizations to build software-defined, hardware-accelerated IT infrastructures from cloud to core data center to edge.

In some aspects, the DPU 105 may be standalone or included in another device. For example, the DPU 105 may be (or included in) a network interface card (NIC). In some aspects, the NIC may be a Smart NIC capable of supporting accelerated networking functions. A Smart NIC may also referred to herein as an intelligent server adapter (ISA). In some cases, the DPU 105 may be a programmable NIC including programmable resources and functions.

In an example of the system 100, the DPU 105 may include a telemetry component 107, a scheduling engine 110, a counter 115 (also referred to herein as a pending interrupt counter), event handler(s) 120, acceleration engines (e.g., semiconductor acceleration engine(s) 125, acceleration engine(s) 130), a network interface 135, a GPU 140, a CPU 141, programmable processing cores 145, a PCI express (PCIe) switch 150, and memory 155.

The telemetry component 107 may support automated communication processes between the DPU 105 and multiple devices and/or data sources (e.g., server 165, DPU resource management circuits 170, databases (not illustrated), etc., aspects of which are later described herein). The telemetry component 107 may support monitoring of devices and data. In some cases, the telemetry component 107 may support monitoring of network infrastructure, storage infrastructure, and resource consumption.

The scheduling engine 110 may be implemented by, for example, integrated circuitry of the DPU 105. In some aspects, the scheduling engine 110 may be referred to herein as a hardware scheduler, a hardware scheduling circuit, or the like.

The scheduling engine 110 may manage the counter 115. In some aspects, the value of the counter 115 may corresponds to a quantity of pending interrupts. In an example, the scheduling engine 110 may increment or decrement the value of the counter 115, aspects of which are described herein.

An event handler 120 is a callback routine that may operates asynchronously once an event takes place. Code included in the event handler 120 may dictate action(s) that follow the event. The system 100 may support multiple unrelated (but cooperative) event handlers 120.

The acceleration engines (e.g., semiconductor acceleration engine(s) 125, acceleration engine(s) 130) may include hardware components or electronic circuitry designed to perform functions with relatively higher efficiency compared to software programs executed on the CPU 141.

The network interface 135 may support the communication (e.g., transmission, reception) of packets between the DPU 105 and other devices (e.g., a communication device, a server 165, a database (not illustrated), etc.). In some aspects, the network interface 135 may support the communication of packets between the DPU 105 and the server 165 (e.g., via the cloud infrastructure(s) 160). In some aspects, the network interface 135 may be a NIC.

The GPU 140 may support processing of computationally intensive workloads (e.g., artificial intelligence, deep learning, data science, etc.). Additionally, or alternatively, The CPU 141 (and/or programmable cores 145) may support processing of computationally intensive workloads.

In some aspects, the CPU 141 and/or programmable cores 145 may be tasked with handling interrupts. For example, the CPU 141 and programmable cores 145 may support processing of events or activities related to a data packet flow. In an example, the DPU 105 may support multiple unrelated (but cooperative) event handlers implemented, for example, at the DPU 105 or at devices separate from the DPU 105. In some cases, the DPU 105 may support multiple unrelated (but cooperative) event handlers.

The programmable cores 145 may be any particular type of programmable processing core, such as a programmable advanced reduced instruction set computer (RISC) machine (ARM) core, and it should be appreciated that any suitable type of processing core or collection of processing cores may be included in the programmable cores 145. The programmable cores 145 may include multiple programmable processing cores of the same type or of different types. Furthermore, as the name suggests, the programmable processing cores may be configurable to perform different processing tasks without departing from the scope of the present disclosure. The programmable cores 145 may support infrastructure networking, security, storage.

In some aspects, the system 100 may support processing threads that respectively correspond to the programmable cores 145. For example, each of the programmable cores 145 may have a respective processing thread. In some examples, one or more of the programmable cores 145 may have multiple processing threads.

The PCIe switch 150 may support switching between buses (e.g., PCIe buses) included in the DPU 105. The PCIe switch 150 may support packet based communications protocols and packet routing (e.g., based on memory address, I/O address, device ID, etc.). Additionally, or alternatively, the DPU 105 may include other switch types (e.g., PCI switches) for switching between buses included in the DPU 105.

The memory 155 may include memory local to the DPU 105. In some aspects, the memory 155 may store instructions and/or data local to the DPU 105. The memory 155 may include one or multiple computer memory devices. The memory 155 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 155, in some examples, may correspond to a computer-readable storage media. In some aspects, the memory 155 may be internal or external to the DPU 105.

Components of the DPU 105 such as, for example, the telemetry component 107, scheduling engine 110, acceleration engines (e.g., semiconductor acceleration engine(s)

125, acceleration engine(s) 130), network interface 135, GPU 140, CPU 141, programmable cores 145, PCIe switch 150, memory 155, may be interconnected by a system bus (not illustrated) of the DPU 105. The system bus may be, for example, a PCIe bus, a PCI bus, or the like. In some aspects, the system bus may include or be any high-speed system bus. Any of the components of the DPU 105 as described herein may include hardware components or electronic circuitry designed to perform functions associated with the components.

The system 100 may include a cloud infrastructure(s) 160, also referred to herein as a digital infrastructure. In an example, the cloud infrastructure(s) 160 may be referred to as a services/applications cloud infrastructure. The cloud infrastructure(s) 160 may be implemented by any combination of servers 165 and/or databases (not illustrated). The cloud infrastructure(s) 160 may provide cloud computing services (also referred to herein as digital services) such as infrastructure as a service (IaaS), platform as a service (Paas), software as a service (Saas), storage as a service (STaaS), security as a service (SECaaS), data as a service (Daas), desktop as a service (DaaS), test environment as a service (TEaaS), and application programming interface (API) as a service (APIaaS). In some examples, the cloud infrastructure(s) 160 may include an API server.

Aspects of the DPU 105, the cloud infrastructure(s) 160, and the server 165 described herein may be implemented by any electronic devices capable of connecting to a wireless or wired network. In some cases, the system 100 may include any number of devices (e.g., DPUs 105, servers 165, etc.) and/or servers 165, and each of the devices and/or servers may be associated with a respective entity.

The system 100 may support the communication of data packets between entities (e.g., DPU(s) 105, communication devices, server(s) 165, etc.) of the system 100, for example, via communications network 103. Aspects of the communications network 103 may be implemented by any communications network capable of facilitating machine-to-machine communications between entities (e.g., any number of DPUs 105, servers 165, devices, etc.). For example, the communications network 103 may include any type of known communication medium or collection of communication media and may use any type of protocols to transport messages, signals, and/or data between endpoints. In some aspects, the communications network 103 may include wired communications technologies, wireless communications technologies, or any combination thereof. In some examples, the communications network 103 may support non-secure communication channels and secure communication channels.

The Internet is an example of a network (e.g., a communications network 103) supported by the system 100, and the network may constitute an Internet Protocol (IP) network consisting of multiple computers, computing networks, and other devices (e.g., DPU 105, servers 165, communications devices, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, Ethernet, InfiniBand™, a cellular network, and any other type of packet-switched or circuit-switched network known in the art. In some cases, the system 100 may include of any combination of networks or network types. In some aspects, the networks may include any combination of communication mediums such as coaxial cable, copper cable/wire, fiber-optic cable, or antennas for communicating data (e.g., transmitting/receiving data).

Example aspects of the system 100 are described with reference to the following figures. Further, it should be noted that although some example aspects are described with reference to the term "Harts," aspects of the disclosure are not limited thereto. The example aspects of the system 100 may be applied to any type of processing thread.

Figure 2:
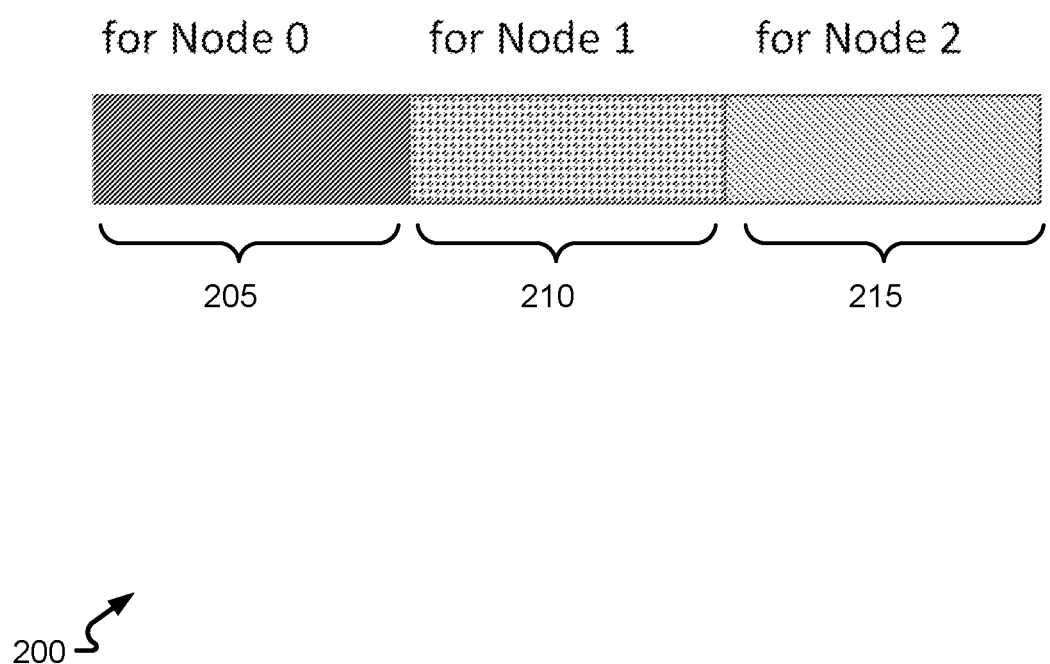
FIG. 2 illustrates an example of message data in accordance with aspects of the present disclosure.

FIG. 2 illustrates an example of message data 200 that supports aspects of the present disclosure.

Referring to FIG. 2, the system 100 may support sending message data 200 to a remote node in response to the remote node arriving at a synchronization point (e.g., a network edge). Message data 200 may be partitioned into data 205, data 210, and data 215 respectively corresponding to different nodes (e.g., Node 0, Node 1, and Node 2), and each of the nodes may be associated with a corresponding entity (e.g., corresponding computing devices).

An example of logic implemented at the DPU 105 in association with sending the message data 200 is below. The logic may be offloaded to the DPU 105. The logic supports sending messages to many destinations (e.g., remote nodes).

```
while(1) {
    wait for a Node to arrive at synchronization;
    i <- node that has arrived;
    send msg[i] to Node i;
}
```

Figure 3A:
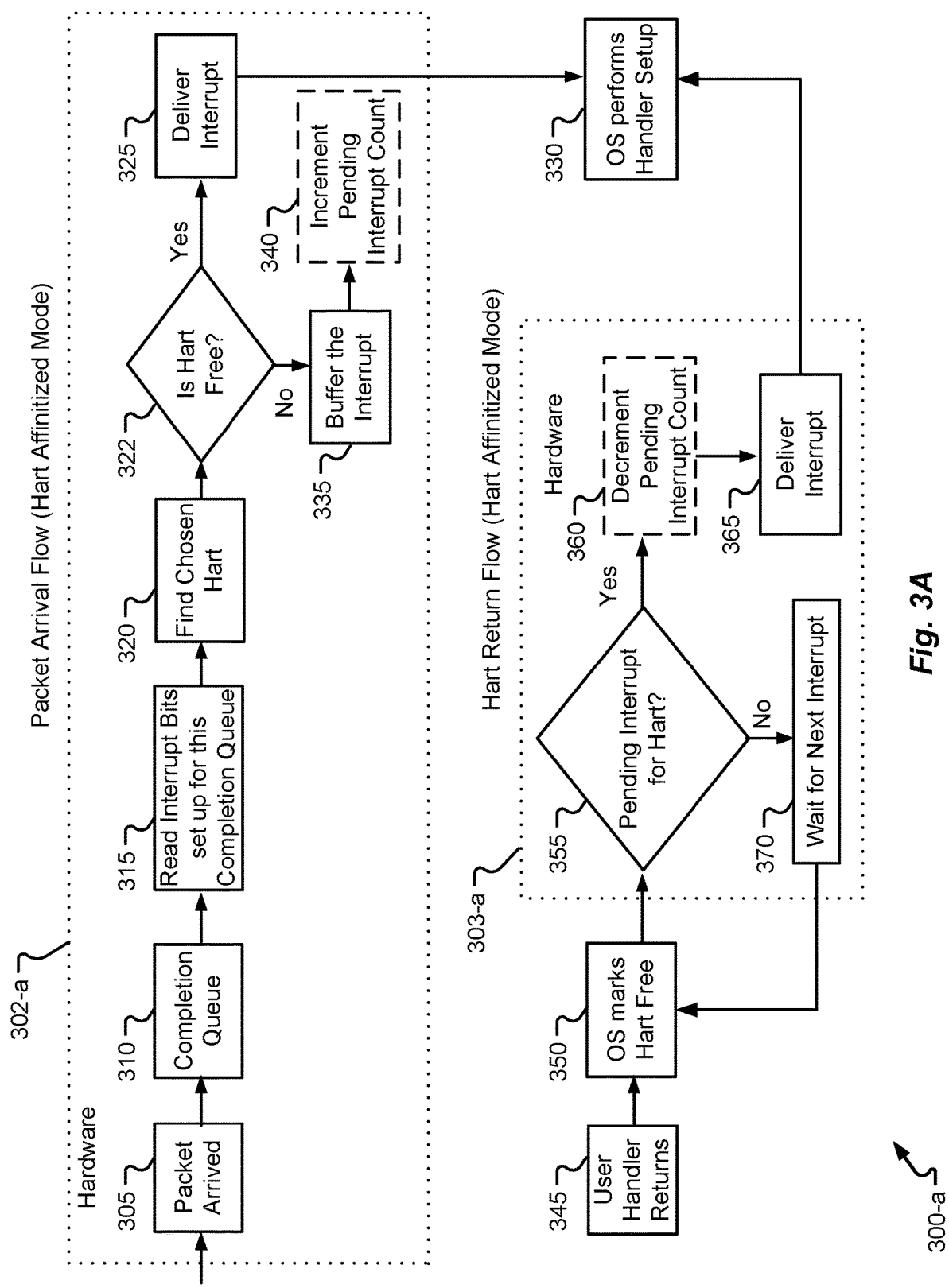
FIGS. 3A and 3B illustrate example process flows in accordance with aspects of the present disclosure.
Figure 3B:
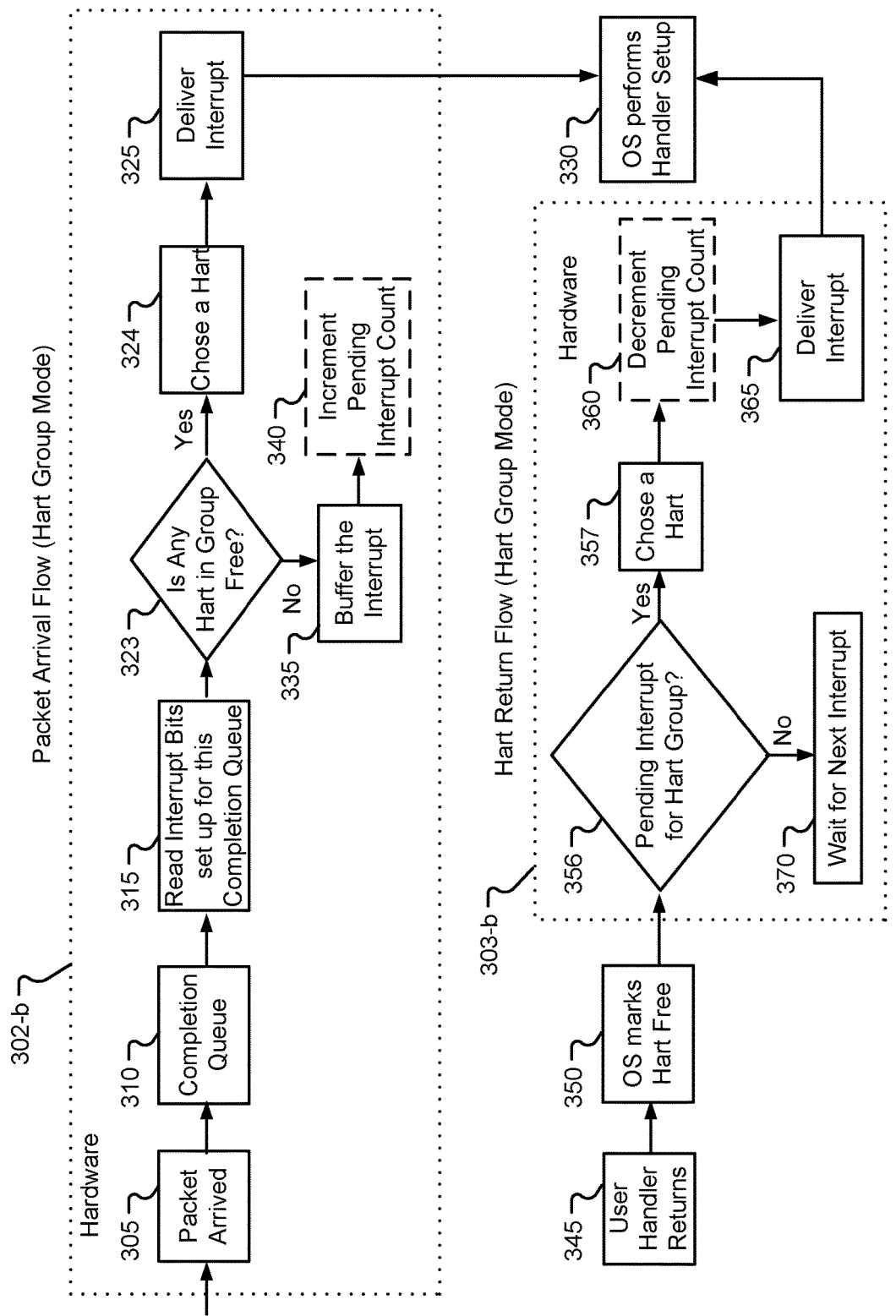

FIGS. 3A and 3B illustrate example process flows 300-*a* and 300-*b* supportive of interrupt delivery, interrupt scheduling, and processing thread selection in accordance with aspects of the present disclosure. For example, aspects of the process flows 300-*a* and 300-*b* support features associated with delivery of interrupts and delivery of work.

In the following description of the process flows 300-*a* and 300-*b*, the operations may be performed in a different order than the order shown, or the operations may be performed in different orders or at different times. Certain operations may also be left out of the process flows 300-*a* and 300-*b*, or other operations may be added thereto.

It is to be understood that while a DPU 105 of a system 100 described herein may perform a number of the operations of process flows 300-*a* and 300-*b*, any device (e.g., another device, another DPU 105, one or more circuits of the DPU 105, scheduling engine 110, etc.) may perform the operations shown.

Referring to FIG. 3A, the process flow 300-*a* is associated with a Hart affinitized mode supported by aspects of the present disclosure. The process flow 300-*a* includes a packet arrival flow 302-*a* and a Hart return flow 303-*a*. The packet arrival flow 302-*a* and the Hart return flow 303-*a* may be implemented by a hardware scheduler (e.g., scheduling engine 110 of FIG. 1) described herein.

At 305, the process flow 300-*a* may include receiving a data packet (e.g., at the scheduling engine 110). The data packet may include an indication of an interrupt to be delivered.

At 310, the process flow 300-*a* may include providing (e.g., by the scheduling engine 110) the arrived data packet to a NIC object such as a completion queue.

The completion queue is an object which includes completed work requests which were posted to work queues (WQ). Every completion indicates that a specific work request (WR) was completed, both for successfully completed WRs and unsuccessfully completed WRs. A completion queue is a mechanism to notify an application about information of ended work requests (e.g., status, opcode, size, source, etc.). A completion queue can service send queues, receive queues, or both. The completion queue may include a set of interrupt bits. In some aspects, the choice of a processing thread or group of processing threads to which to serve the interrupt may be coded in the interrupt bits.

At 315, the process flow 300-*a* may include reading the interrupt bits of the completion queue. The interrupt bits may indicate that a Hart that has been chosen for processing the interrupt.

At 320, the process flow 300-*a* may include finding the chosen Hart based on the read interrupt bits. For example, at 320, based on the interrupt bits, the scheduling engine 110 may determine a Hart to which the interrupt is to be delivered.

At 322, the process flow 300-*a* may include determining whether the chosen Hart is available (e.g., free, not in use). For example, 322 may include determining an availability status of the chosen Hart.

At 325, the process flow 300-*a* may include delivering the interrupt to the chosen Hart in response to the availability status indicating the chosen Hart is available (e.g., Is Hart Free?="Yes").

At 330, the process flow 300-*a* may include performing (e.g., by the operating system) handler setup. For example, the operating system may set up a user handler (e.g., event handler 120 of FIG. 1) in association with processing the interrupt using the Hart described with reference to 322 and 325. For example, the operating system may configure parameters of the user handler in association with processing the interrupt.

At 335, the process flow 300-*a* may include buffering the interrupt in response to the availability status indicating the chosen Hart is unavailable (e.g., Is Hart Free?="No"). For example, the process flow 300-*a* may include storing the interrupt to a memory buffer of pending interrupts. In an example, the memory buffer may be implemented at memory 155 of FIG. 1.

At 340, the process flow 300-*a* may include incrementing a pending interrupt count. In some aspects, the pending interrupt count may be referred to as an interrupt status indicator. For example, the process flow 300-*a* may include increasing the pending interrupt count in response to the availability status indicating the chosen Hart is unavailable (e.g., Is Hart Free?="No") and/or in response to buffering the interrupt. The value of the counter may indicate a total quantity of pending interrupts.

At 345 of the process flow 300-*a*, the user handler may return (e.g., yield) a Hart to the operating system. The Hart returned to the operating system may be the same Hart described with reference to chosen Hart of 320 or a different Hart.

At 350 of the process flow 300-*a*, the operating system may mark the Hart as free (e.g., available). For example, the operating system may mark the Hart as available for use by other user handlers in association with processing an interrupt. In an example, the operating system may provide an indication of the availability of the Hart to the scheduling engine 110.

At 355, the process flow 300-*a* may include identifying whether a pending interrupt (e.g., any of the buffered interrupts) is assigned to the Hart.

At 360, the process flow 300-*a* may include decrementing the pending interrupt count. For example, the process flow 300-*a* may include decreasing the pending interrupt count in response to identifying a pending interrupt for the Hart (e.g., Pending Interrupt for Hart?="Yes").

At 365, the process flow 300-*a* may include delivering the interrupt to the available Hart. The process flow 300-*a* may return to 330, which may include performing (e.g., by the operating system) handler setup. For example, the operating system may set up a user handler (e.g., event handler 120 of FIG. 1) in association with processing the interrupt using the Hart described with reference to 350.

Additionally, or alternatively, at 370, the process flow 300-*a* may include waiting for the operating system to mark another Hart as free (e.g., available) for use by other user handlers in association with processing an interrupt.

Referring to FIG. 3B, the process flow 300-*b* is associated with a Hart group mode supported by aspects of the present disclosure. The process flow 300-*b* includes a packet arrival flow 302-*b* and a Hart return flow 303-*b*. The packet arrival flow 302-*b* and the Hart return flow 303-*b* may be implemented by a hardware scheduler (e.g., scheduling engine 110 of FIG. 1) described herein. The process flow 300-*b* includes example aspects of elements of the process flow 300-*a*, and descriptions of like elements are omitted for brevity.

For example, referring to the packet arrival flow 302-*b*:

At 323, the process flow 300-*b* may include determining whether any Hart is available (e.g., free, not in use) in a Hart group. For example, at 323, the process flow 300-*b* may include determining availability statuses of one or more Harts in the Hart group. In some examples, at 323, the process flow 300-*b* may include determining availability statuses of the Harts in the Hart group until successfully identifying an available Hart of the Hart group (e.g., identifying a first available Hart). In some other examples, at 323, the process flow 300-*b* may include determining availability statuses of multiple Harts in the Hart group and identifying which of the Harts are available or unavailable.

At 324, the process flow 300-*b* may include selecting a Hart in response to an availability of at least one Hart in the Hart Group (e.g., Is Any Hart in Group Hart Free?="Yes"). In an example, 324 may include selecting a Hart which first becomes available (e.g., a first available Hart). In some other aspects, at 324, the process flow 300-*b* may include selecting a Hart from among any available Harts in the Hart Group.

At 325, the process flow 300-*b* may include delivering the interrupt to the chosen Hart.

At 335, the process flow 300-*b* may include buffering the interrupt in response to none of the Harts in the Hart Group being available (e.g., Is Any Hart in Group Hart Free?="No"). For example, the process flow 300-*b* may include storing the interrupt to the memory buffer of pending interrupts.

At 340, the process flow 300-*b* may include incrementing the pending interrupt count.

In another example, referring to the Hart return flow 303-*b*:

At 350 of the process flow 300-*b*, the operating system may mark a Hart as free (e.g., available). The operating system may provide an indication of the availability of the Hart to the scheduling engine 110.

At 355, the process flow 300-*a* may include identifying whether a pending interrupt (e.g., any of the buffered interrupts) is assigned to a Hart group corresponding to the Hart.

At 357, the process flow 300-*b* may include selecting an available Hart from the Hart group in response to identifying that the pending interrupt is assigned to the Hart group (e.g., Pending Interrupt for Hart Group?="Yes"). For example, at 357, the process flow 300-b may include selecting the Hart (of 350) or another available Hart of the Hart group. In some cases, selecting an available Hart from the Hart group may be based on a set of criteria (e.g., selecting the first available Hart).

At 360, the process flow 300-b may include decrementing the pending interrupt count in response to choosing a Hart.

At 365, the process flow 300-b may include delivering the interrupt to the chosen Hart. The process flow 300-b may return to 330, which may include performing (e.g., by the operating system) handler setup. For example, the operating system may set up a user handler (e.g., event handler 120 of FIG. 1) in association with processing the pending interrupt using the Hart that was chosen at 357.

Additionally, or alternatively, at 370, the process flow 300-b may include waiting for the operating system to mark another Hart as free (e.g., available) for use by other user handlers in association with processing an interrupt. For example, in response to identifying that no pending interrupts are assigned to the Hart group (e.g., Pending Interrupt for Hart Group?="No"), the process flow 300-b may include waiting for the operating system to mark another Hart as free.

In some aspects, the system 100 may implement either of the process flow 300-a and the process flow 300-b as a default mode.

Figure 4A:
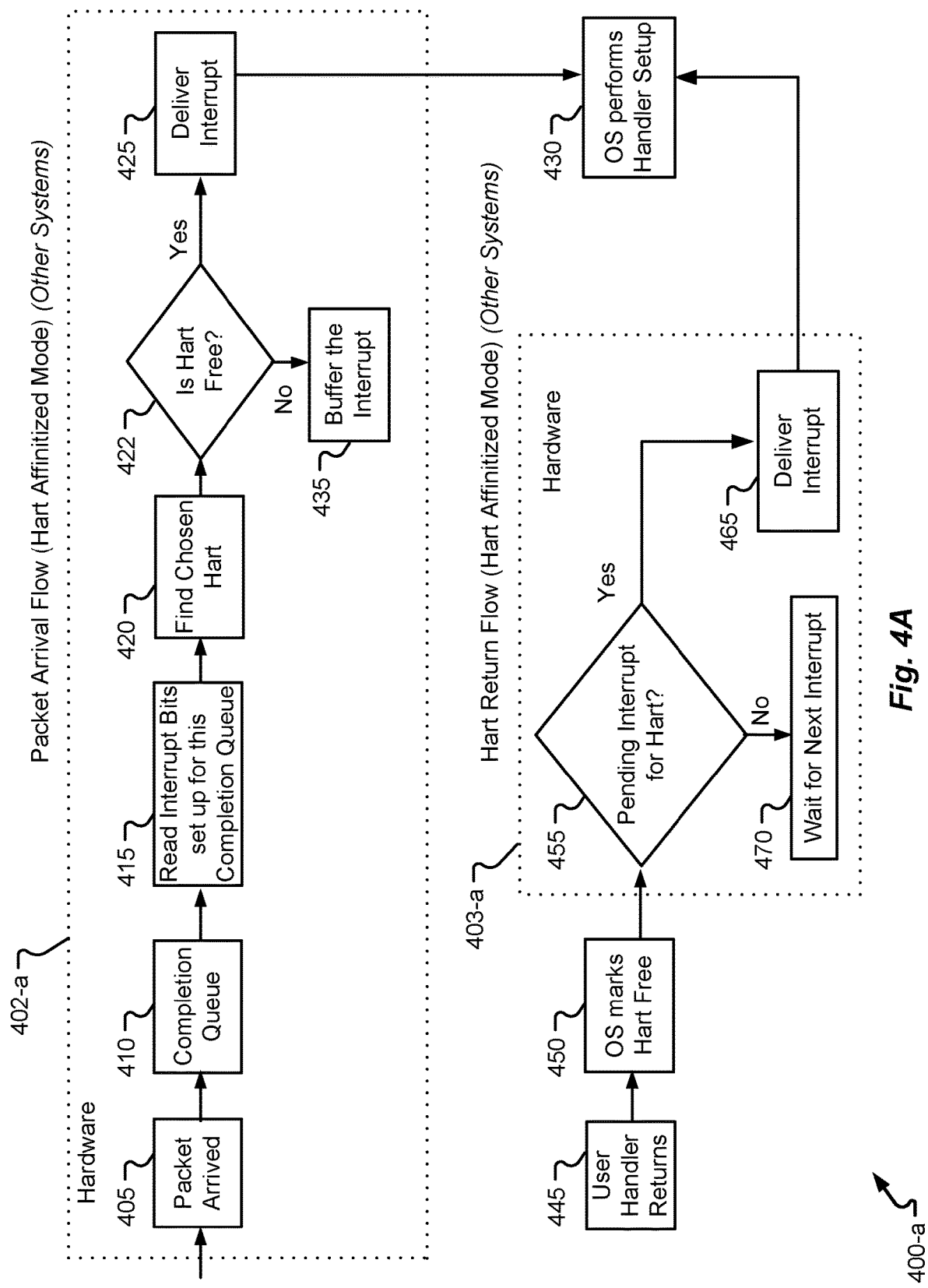
FIGS. 4A and 4B illustrate example process flows in accordance with aspects of the present disclosure.
Figure 4B:
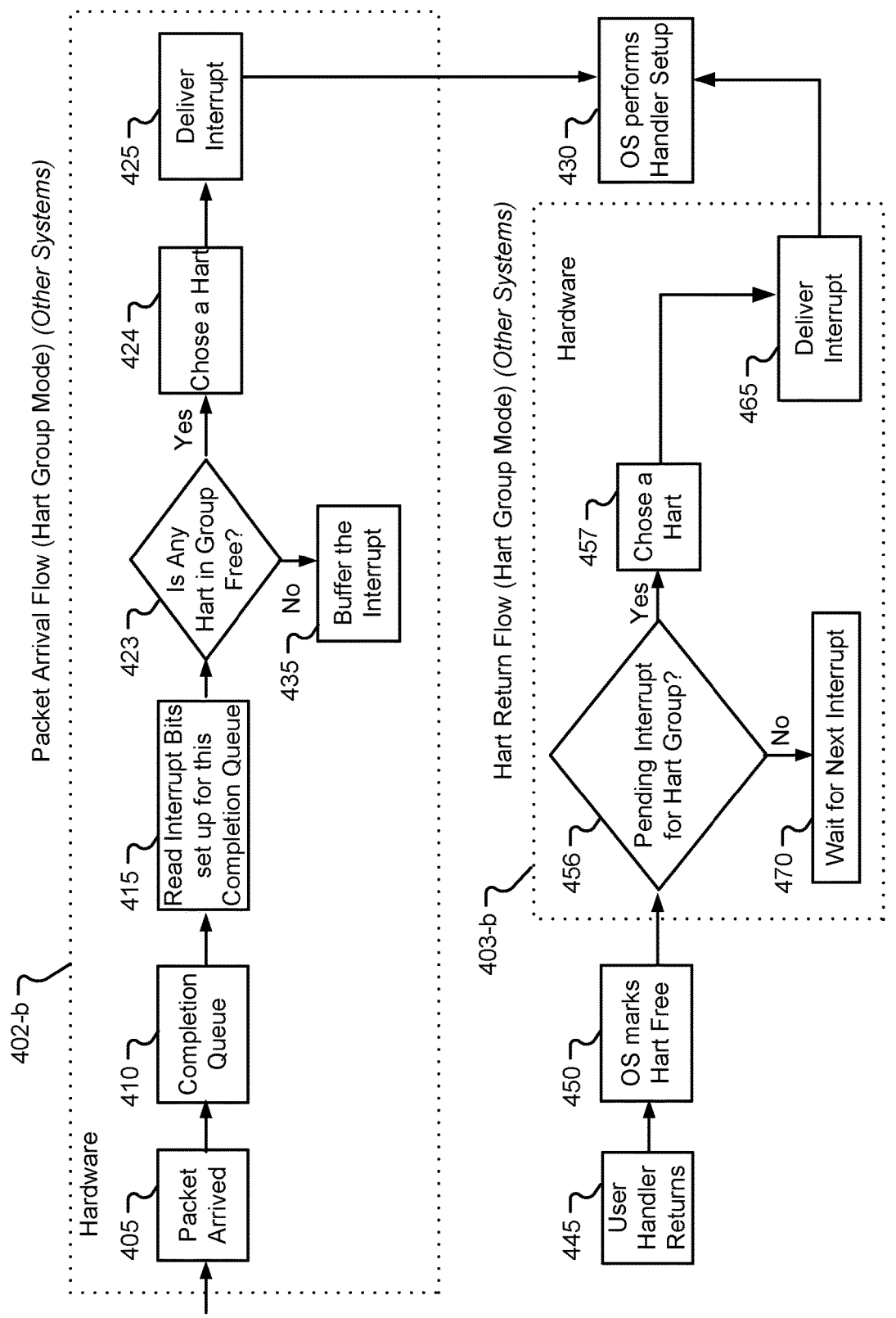

FIGS. 4A and 4B illustrate example process flows 400-a and 400-b supportive of interrupt delivery and processing thread selection in accordance with some other systems. For example, aspects of the process flows 400-a and 400-b support features associated with delivery of interrupts and work, as implemented by some other systems.

Aspects of the process flow 400-a of FIG. 4A are described herein. The process flow 400-a is associated with a Hart affinitized mode supported by some other systems. The process flow 400-a includes a packet arrival flow 402-a and a Hart return flow 403-a. For brevity, descriptions are omitted for elements of the process flow 400-a that include like aspects of elements of the process flow 300-a.

Other systems utilizing the process flow 400-a fail to include and/or manage a pending interrupt counter as described with reference to 340 and 360 of FIG. 3A. Such systems are unable to provide knowledge (e.g., presence of pending interrupts, quantity of pending interrupts, etc.) to a user-defined event handler for determining whether to return a processing thread to an operating system.

Aspects of the process flow 400-b of FIG. 4B are described herein. The process flow 400-b is associated with a Hart group mode supported by some other systems. The process flow 400-a includes a packet arrival flow 402-b and a Hart return flow 403-b. For brevity, descriptions are omitted for elements of the process flow 400-b that include like aspects of elements of the process flow 300-b.

Other systems utilizing the process flow 400-b fail to include and/or manage a pending interrupt counter as described with reference to 340 and 360 of FIG. 3B. Such systems are unable to provide knowledge (e.g., presence of pending interrupts, quantity of pending interrupts, etc.) to a user-defined event handler for determining whether to return a processing thread to an operating system.

Figure 5:
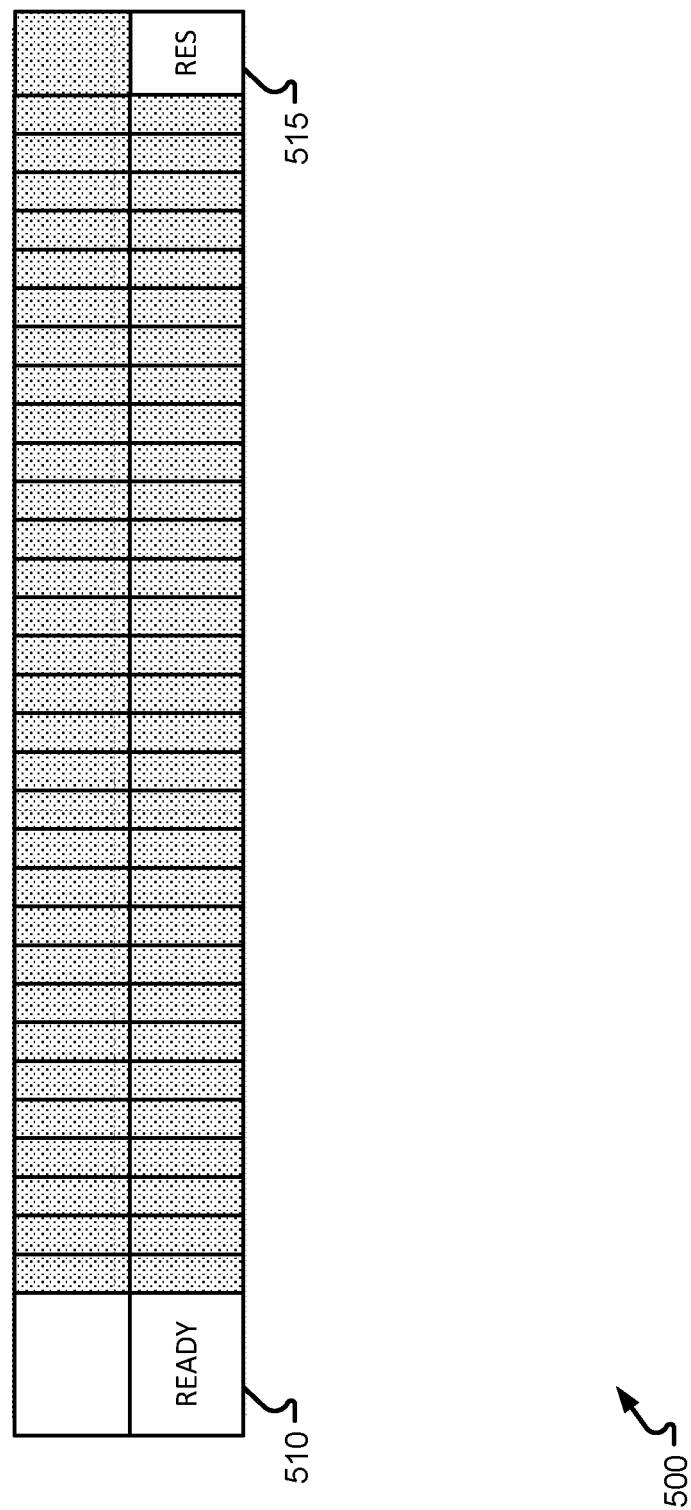
FIG. 5 illustrates an example of a doorbell interface in accordance with aspects of the present disclosure.

FIG. 5 illustrates an example of a doorbell interface 500 in accordance with aspects of the present disclosure. In an example, via the doorbell interface 500, a hardware scheduler (e.g., scheduling engine 110 of FIG. 1) may inform a user handler of whether a pending interrupt exists. Based on the information, the user handler may determine whether to yield a processing thread to the operating system for use by another user handler.

In an example, the hardware scheduler may provide the data (or a portion of the data) included in the doorbell interface 500 in response to a query request from the user handler. In an example, the hardware scheduler or the user handler may query the hardware scheduler for information indicating the existence of any pending interrupts.

Ready Bit 510 may indicate whether the query request has been received by the hardware scheduler. For example, a bit value of '0' may indicate a result that the last query request has not yet been received by the hardware scheduler (RES field is invalid). In another example, a bit value of '1' may indicate a result that the last query request has been received by the hardware scheduler (RES field is valid).

RES field 515 (result) provides information, returned from the hardware scheduler, indicating whether a pending interrupt exists and is waiting. For example, a bit value of '0' in the RES field 515 may indicate that no pending interrupt exists. In another example, a bit value of '1' in the RES field 515 may indicate that a pending interrupt exists.

Accordingly, for example, aspects of the doorbell interface 500 may support providing an indication of whether a pending interrupt exists, while minimizing the amount of information provided in the indication. Accordingly, for example, aspects of the doorbell interface 500 support data security in a multi-tenant environment in which multiple entities may be able to view the same data.

Figure 6:
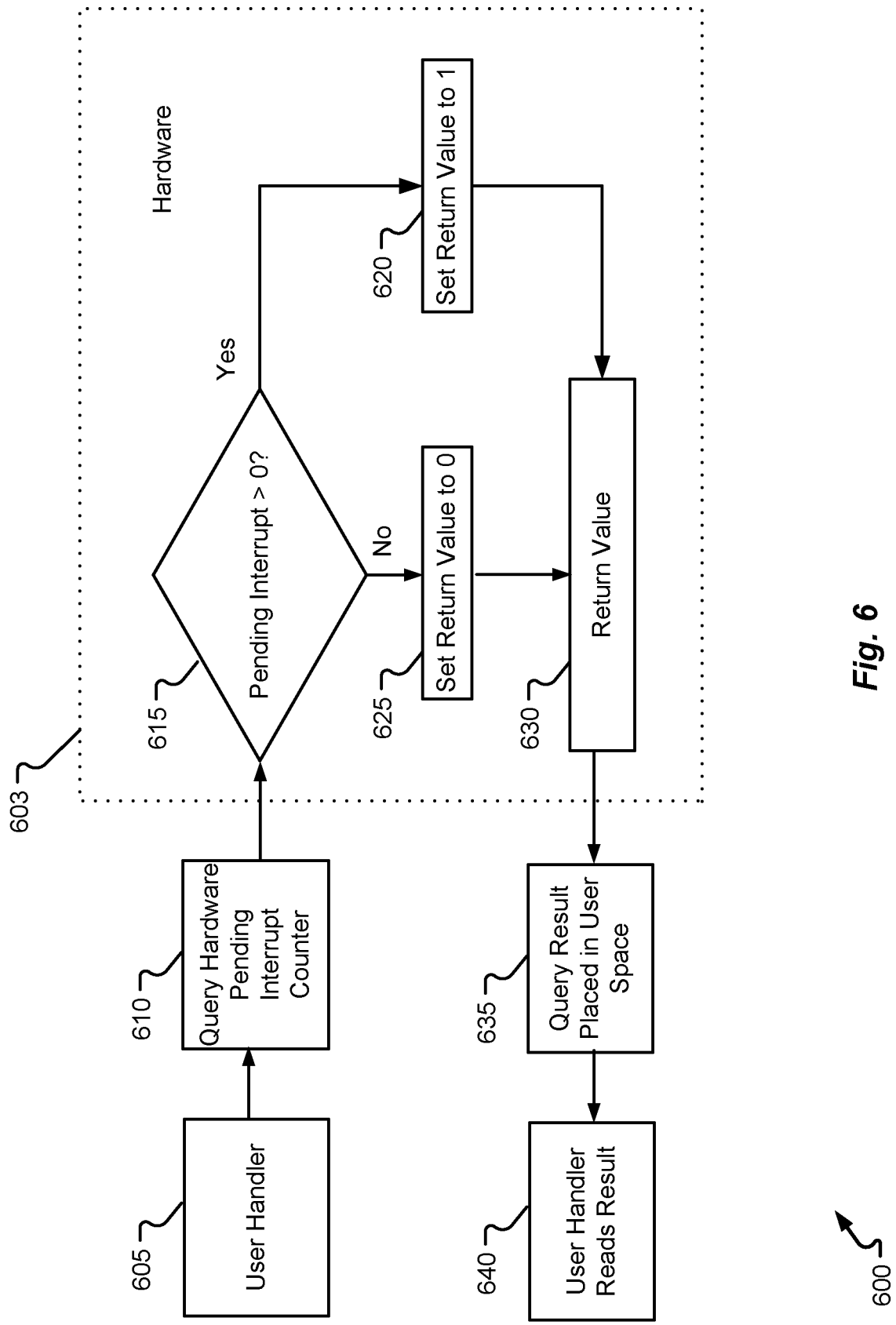
FIG. 6 illustrates an example of a process flow in accordance with aspects of the present disclosure.

FIG. 6 illustrates an example of a process flow 600 in accordance with aspects of the present disclosure.

The process flow 600 supports aspects of checking a pending interrupt count in response to a query. The process flow 600 may be implemented by example aspects of a hardware scheduler and a user handler described herein (e.g., scheduling engine 110 and event handler 120 of FIG. 1). In an example, a portion (e.g., process flow 603) of the process flow 600 may be implemented by the hardware scheduler in response to a query from the user handler.

In the following description of the process flow 600, the operations may be performed in a different order than the order shown, or the operations may be performed in different orders or at different times. Certain operations may also be left out of the process flow 600, or other operations may be added thereto.

It is to be understood that while a DPU 105 of a system 100 described herein may perform a number of the operations of process flow 600, any device (e.g., another device, another DPU 105, one or more circuits of the DPU 105, scheduling engine 110, event handler 120, etc.) may perform the operations shown.

At 610, a user handler 605 may provide a query to the hardware scheduler. In some aspects, the user handler 605 may query a pending interrupt counter of the hardware scheduler. The query may include a request for information indicating the existence of any pending interrupts.

At 615, the hardware scheduler may determine whether any interrupts are pending. For example, the hardware scheduler may determine whether a pending interrupt count is greater than a threshold value (e.g., greater than zero interrupts). In some aspects, the hardware scheduler may extract the information from a pending interrupt counter described with reference to FIGS. 1, 3A, and 3B.

At 620, the hardware scheduler may set a return value to '1' in response to the pending interrupt count being greater than the threshold value (e.g., Pending Interrupt>0?="Yes").

The return value may be, for example, a bit value described with reference to RES field 515 of FIG. 5.

Additionally, or alternatively, at 625, the hardware scheduler may set the return value to '0' in response to the pending interrupt count not being greater than the threshold value (e.g., Pending Interrupt>0?="No").

At 630, the hardware scheduler may output the return value.

At 635, the hardware scheduler may provide a query result to the user handler. For example, the hardware scheduler may place the query result in a user space corresponding to the user handler. The query result may include aspects of the doorbell interface 500 of FIG. 5. For example, the query result may include a result (e.g., a bit value in RES field 515) indicating whether a pending interrupt exists and a ready bit (e.g., Ready Bit 510 of FIG. 5).

At 640, the user handler may read the query result. Based on the query result, the user handler may determine whether to yield a processing thread to the operating system. Example aspects of yielding the processing thread based on the query result are later described with reference to FIG. 7.

In some cases, if the user handler reads a query result indicating a pending interrupt, it is possible that the user handler may still not yield a processing thread for use by the pending interrupt. For example, as described with reference to Example Approach 3 above, the user handler may completely take over a processing thread used by the user handler, never returning the processing thread to the operating system. The operating system supports a watchdog mechanism that can terminate the user handler, which may prevent potential deadlocks in the operating system.

Figure 7:
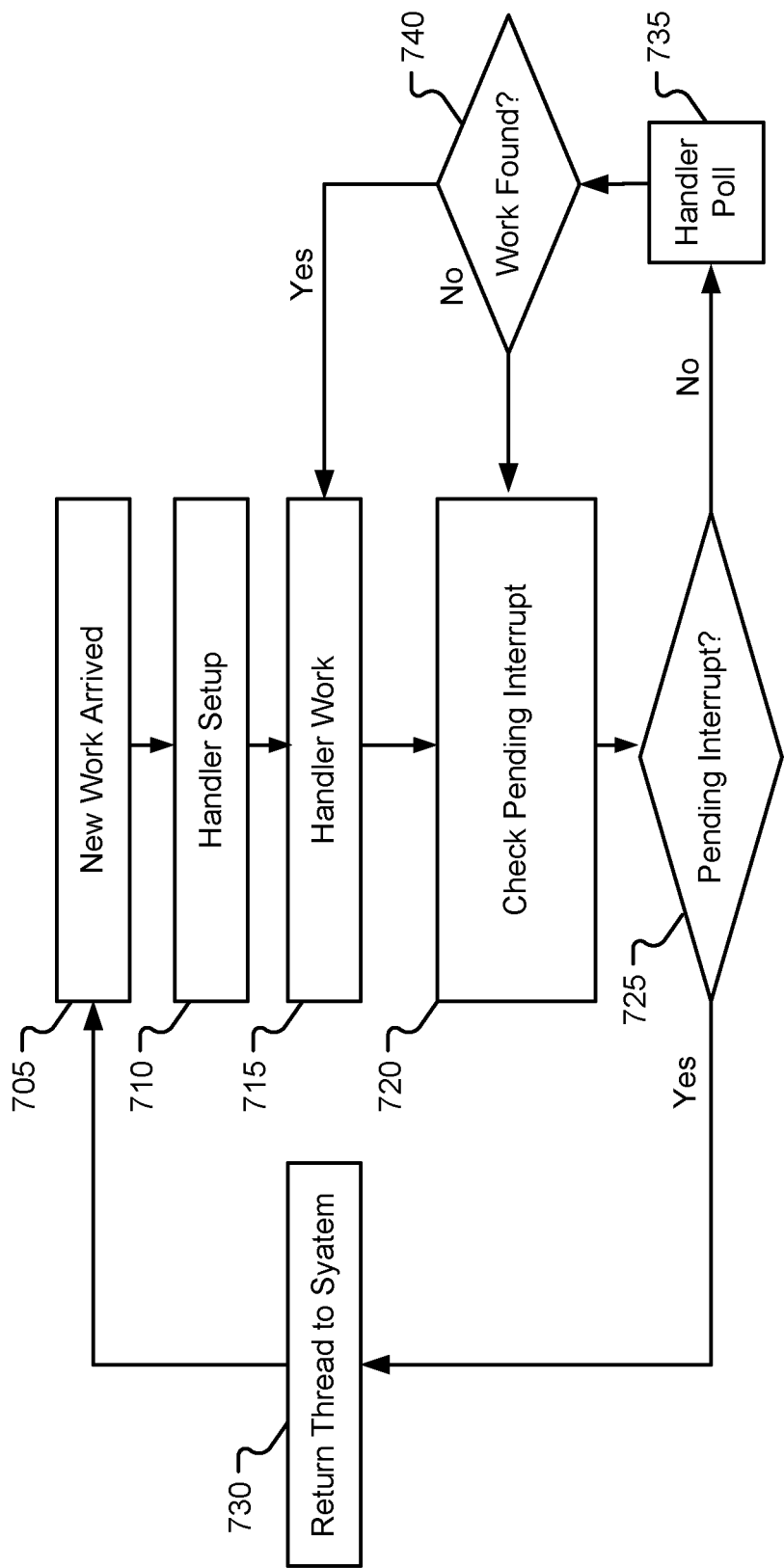
FIG. 7 illustrates an example of a process flow in accordance with aspects of the present disclosure.

FIG. 7 illustrates an example of a process flow in accordance with aspects of the present disclosure.

The process flow 700 supports aspects of using the query result indicating the pending interrupt. The process flow 700 may be implemented by example aspects of a user handler described herein (e.g., event handler 120 of FIG. 1).

In the following description of the process flow 700, the operations may be performed in a different order than the order shown, or the operations may be performed in different orders or at different times. Certain operations may also be left out of the process flow 700, or other operations may be added thereto.

It is to be understood that while a DPU 105 of a system 100 described herein may perform a number of the operations of process flow 700, any device (e.g., another device, another DPU 105, one or more circuits of the DPU 105, scheduling manager 110, event handler 120, etc.) may perform the operations shown.

At 705, new work may arrive at the user handler. For example, the operating system may deliver work (e.g., an interrupt) to the user handler for processing using a processing thread.

At 710, the operating system may set up the user handler (e.g., configure parameters of the user handler) in association with processing the work.

At 715, the user handler may process the work using the processing thread.

At 720, the user handler may check for pending interrupts. For example, the user handler may provide a query to the hardware scheduler (e.g., as described with reference to 610 of FIG. 6).

At 725, the user handler may determine whether a pending interrupt exists. For example, the user handler may read a query result provided by the hardware scheduler (e.g., as described with reference to 640 of FIG. 6).

At 730, in response to the query result (e.g., Pending Interrupt?="Yes"), the user handler may yield the processing thread to the operating system.

Additionally, or alternatively, at 735, in response to the query result (e.g., Pending Interrupt?="No"), the user handler may refrain from yielding the processing thread to the operating system. For example, at 735, the user handler may poll a network completion queue (e.g., completion queue 310 of FIG. 3) to attempt to find additional work.

At 740, the user handler may receive a result associated with polling the network completion queue. Based on a positive result associated with polling the network completion queue (e.g., Work Found?="Yes"), the user handler may return to 715 and process the additional work using the processing thread. Based on a negative result associated with polling the network completion queue (e.g., Work Found?="No"), the user handler may return to 720 and again check for pending interrupts.

Example advantages of the process flow 700 are described herein.

If $T_i$ is the cost of checking pending interrupts (e.g., at 720), the best-case efficiency for processing n work items is: $n*T_w/(T_s+n*(T_p+T_i)+n*T_w)$. The best-case efficiency starts to approach 1 if n is large (e.g., above a corresponding threshold) and $T_p$ and $T_i$ are small (e.g., below corresponding thresholds). The worst-case efficiency is bound to: $T_w/(T_s+T_i+T_w)$, which provides improved worst-case efficiency in comparison to Example Approach 2 (and FIG. 8B) in which the worst-case efficiency is $T_w/(T_s+n*T_p+T_w)$.

Accordingly, for example, aspects of the process flow 700 may support simplified programming models in that a user handler (e.g., application) is free of guesswork when determining whether to yield a processing thread to the operating system. That is, for example, the user handler is free from guessing how many times to poll for work (and failing to find work) before yielding the processing thread to the operating system.

Figure 8A:
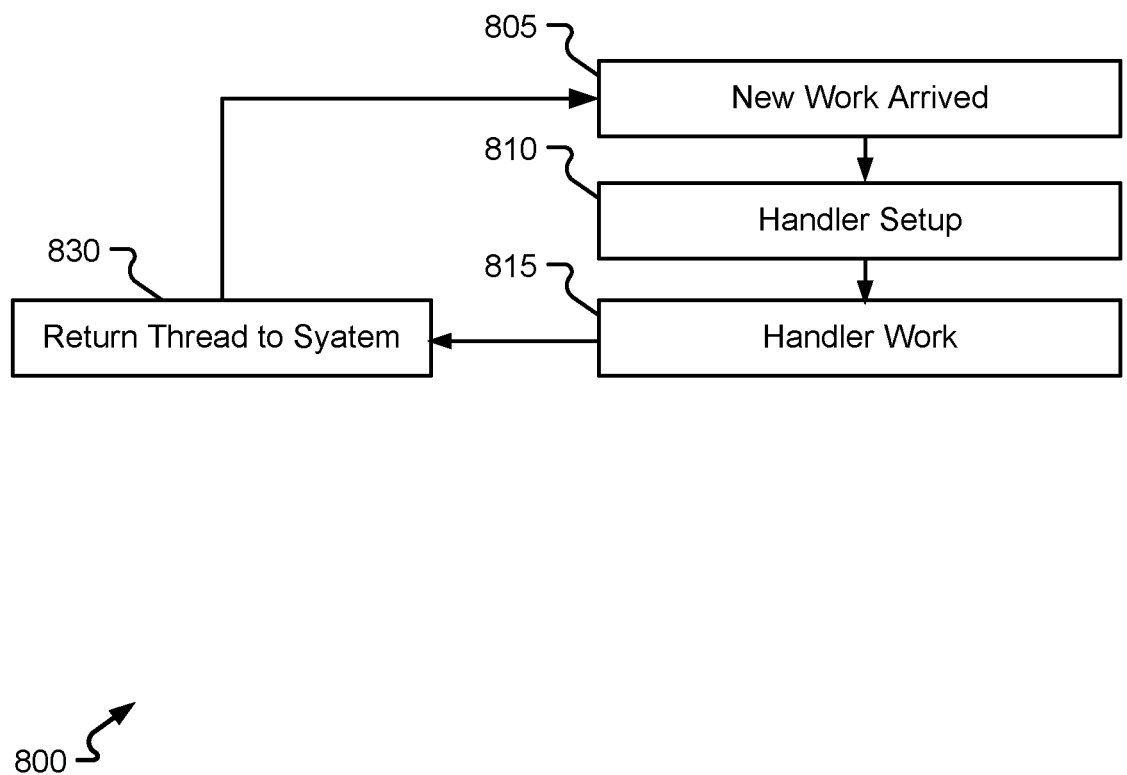
FIGS. 8A and 8B illustrate example process flows in accordance with aspects of the present disclosure.
Figure 8B:
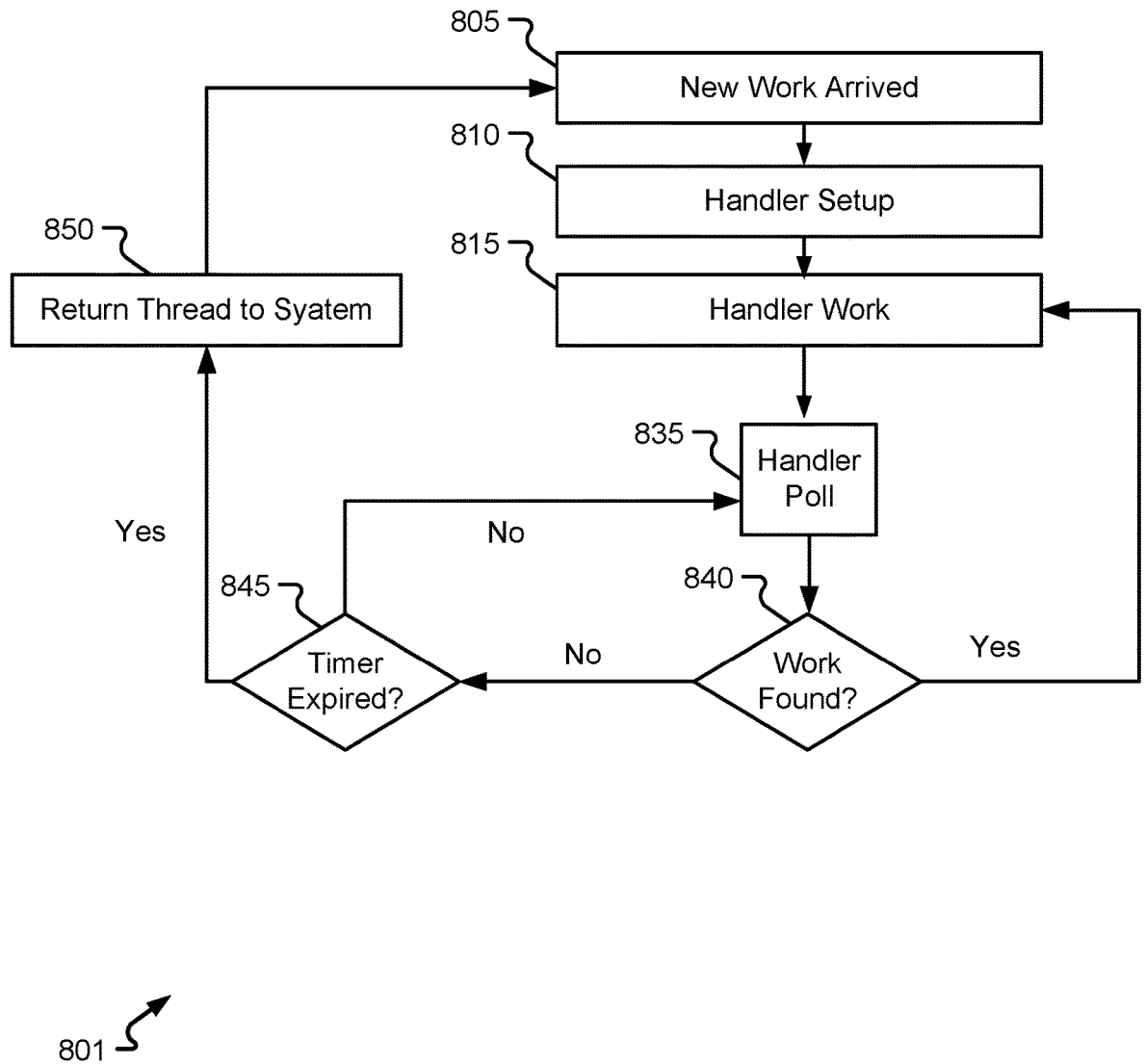

FIGS. 8A and 8B illustrate example process flows in accordance with some other cooperatively scheduled systems. For example, FIG. 8A illustrates an example process flow 800 corresponding to a cooperative scheduling model in some other cooperatively scheduled systems. FIG. 8B illustrates an example process flow 801 of batching, as implemented in some other cooperatively scheduled systems.

Aspects of the process flow 800 of FIG. 8A are described herein. For brevity, descriptions are omitted for elements of the process flow 800 that include like aspects of elements of the process flow 700. In other systems utilizing the process flow 800, user handlers do not check for pending interrupts (e.g., as described with reference to 720 of FIG. 7) in association with yielding a processing thread to the operating system.

For example, according to the process flow 800, once new work arrives at 805, the operating system sets up a user handler at 810 in association with processing the new work using a processing thread. The event handler completes work at 815 using the processing thread. At 830, the event handler returns the processing thread to the operating system. The cost of event handler setup at 810 (for each iteration of the process flow 800) represents a large fraction of overall time, reducing efficiency.

Aspects of the process flow 801 of FIG. 8B are described herein. For brevity, descriptions are omitted for elements of the process flow 801 that include like aspects of elements of the process flow 700. In other systems utilizing the process flow 801, user handlers do not check for pending interrupts (e.g., as described with reference to 720 of FIG. 7) in association with yielding a processing thread to the operating system.

For example, according to the process flow 800, at 805, new work may arrive at a user handler.

At 810, the operating system may set up the user handler in association with processing the work.

At 815, the user handler may process the work using the processing thread.

At 835, in response to completing the work, the user handler may poll a network completion queue to attempt to find additional work.

At 840, the user handler may receive a result associated with polling the network completion queue. Based on a positive result associated with polling the network completion queue (e.g., Work Found?="Yes"), the user handler may return to 815 and process the additional work using the processing thread.

At 845, in response to a negative result associated with polling the network completion queue (e.g., Work Found?="No"), the user handler may check whether a timer has expired. If the timer has not expired (Timer Expired?="No"), the user handler may return to 835 to again poll for additional work. If the timer has expired (Timer Expired?="Yes"), the user handler may proceed to 850 and return the processing thread to the operating system.

Accordingly, as described with reference to FIG. 8B, the user handler polls for additional events (e.g., with a goal of finding more work) while still activated, and without returning the processing thread to the operating system until the expiry of a timer. If the user handler succeeds at finding additional work while still activated, the user handler may avoid costly activation latency. However, by continuing to poll for work until the expiry of the timer, the user handler wastes cycles in aggregate (e.g., hogs the processing thread), thereby preventing other user handlers from otherwise running and using the processing thread.

Figure 9A:
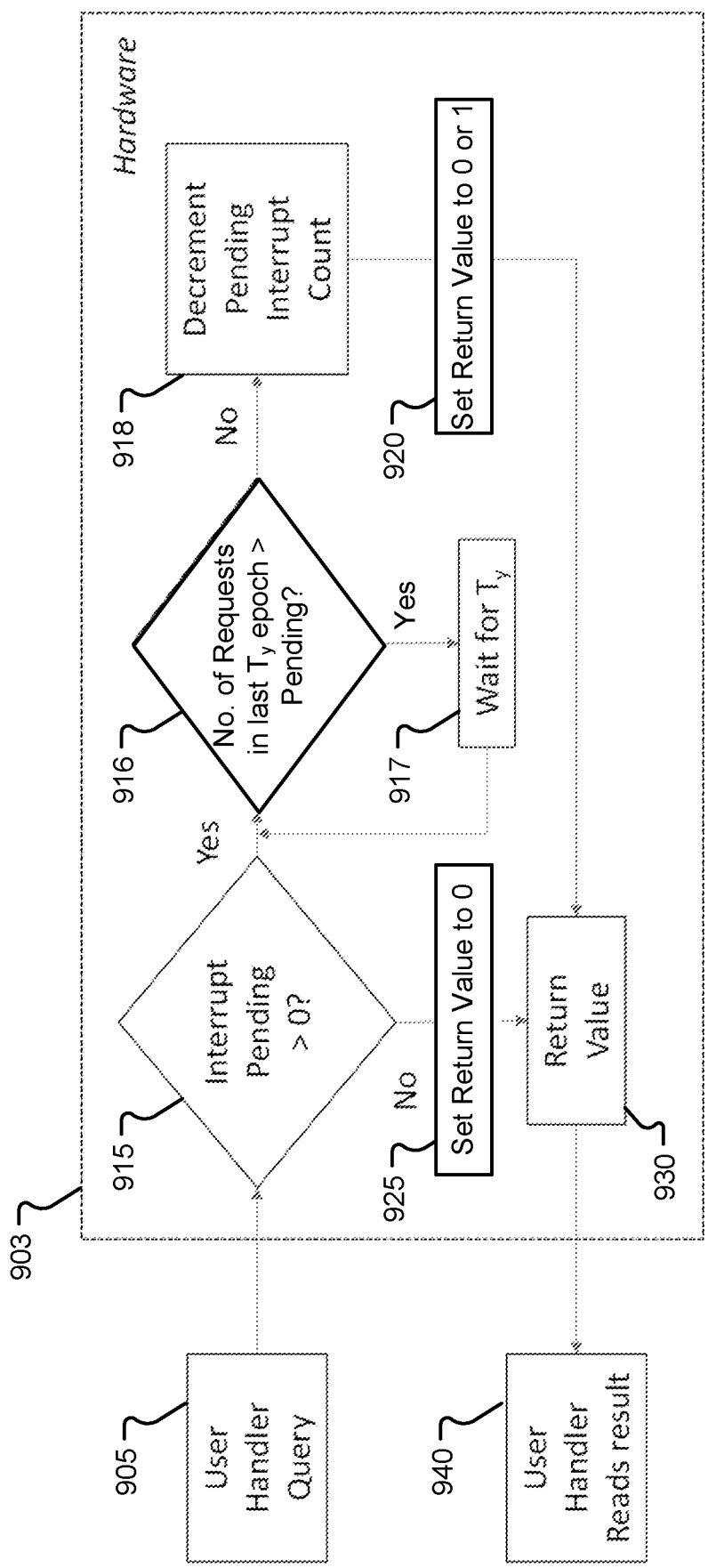
FIG. 9A illustrates an example of a process flow in accordance with aspects of the present disclosure.
Figure 9B:
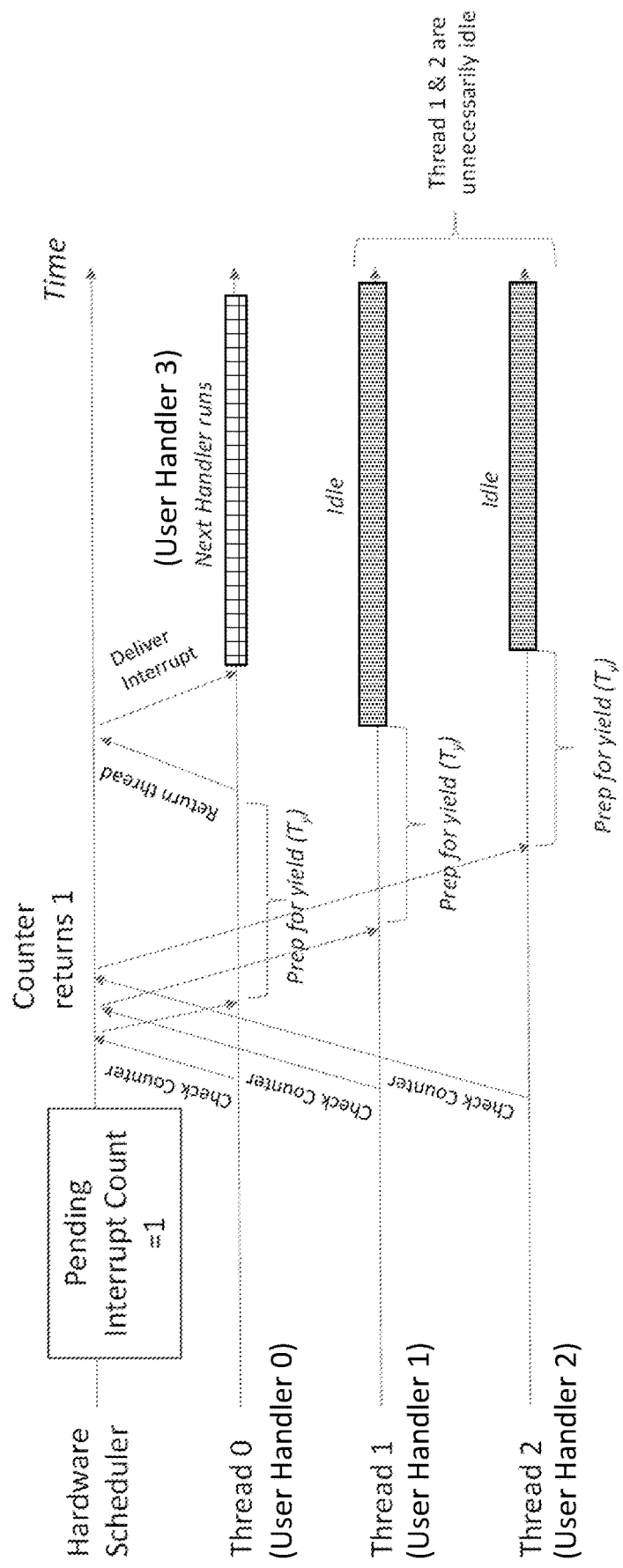
FIG. 9B illustrates an example diagram in accordance with aspects of the present disclosure.

Aspects of FIGS. 9A and 9B support a yield cascade solution by throttling responses, for example, for cases in which pending interrupt checks are requested by multiple user handlers within a threshold temporal duration (e.g., simultaneously).

FIG. 9A illustrates an example of a process flow 900 in accordance with aspects of the present disclosure. FIG. 9B illustrates an example timing diagram 901.

The process flow 900 may be implemented by example aspects of a hardware scheduler and a user handler described herein (e.g., scheduling engine 110 and event handler 120 of FIG. 1). In an example, a portion (e.g., process flow 903) of the process flow 900 may be implemented by the hardware scheduler in response to a query from the user handler. The process flow 900 includes example aspects of the process flow 600 of FIG. 6, and some descriptions of like elements are omitted for brevity.

In the following description of the process flow 900, the operations may be performed in a different order than the order shown, or the operations may be performed in different orders or at different times. Certain operations may also be left out of the process flow 900, or other operations may be added thereto.

It is to be understood that while a DPU 105 of a system 100 described herein may perform a number of the operations of process flow 900, any device (e.g., another device, another DPU 105, one or more circuits of the DPU 105, scheduling engine 110, event handler 120, etc.) may perform the operations shown.

At 905, a user handler may provide a query to the hardware scheduler. In some aspects, the hardware scheduler or the user handler may query a pending interrupt counter of the hardware scheduler. The query may include a request for information indicating the absence or existence of any pending interrupts.

At 915, the hardware scheduler may determine whether any interrupts are pending (e.g., Interrupt Pending>0?). In some aspects, at 915, the hardware scheduler may determine the quantity of pending interrupts.

At 916, the hardware scheduler may determine whether a quantity of queries (or requests corresponding to the queries) received by the hardware scheduler from user handlers exceeds the quantity of pending interrupts. The queries may include requests for information indicating the absence or existence of any pending interrupts. In some aspects, the hardware scheduler may determine whether a quantity of the queries (or corresponding requests) with respect to a temporal duration Ty (also referred to herein as Ty epoch) exceeds the quantity of pending interrupts.

For example, at 917, the hardware scheduler may wait for another duration Ty in response to determining the quantity of requests exceeds the quantity of pending interrupts (e.g., No. of Requests in last Ty epoch>Pending?="Yes").

At 918, the hardware scheduler may decrement the pending interrupt count in response to determining the quantity of requests does not exceed the quantity of pending interrupts (e.g., No. of Requests in last Ty epoch>Pending?="No").

At 920, the hardware scheduler may set a return value in response to decrementing the pending interrupt count. For example, the hardware scheduler may set the return value to '0' if (in response to decrementing the pending increment count at 918) the pending interrupt count is equal to zero. In another example, the hardware scheduler may set the return value to '1' if (in response to decrementing the pending increment count at 918) the pending interrupt count is greater than zero (e.g., pending interrupt count is equal to 1, 2, 3, etc.). The return value may be, for example, a bit value described with reference to RES field 515 of FIG. 5.

At 925, the hardware scheduler may set the return value to '0' in response to the pending interrupt count not being greater than zero (e.g., Pending Interrupt>0?="No").

At 930, the hardware scheduler may output the return value. In an example, the hardware scheduler may provide a query result to the user handler.

At 940, the user handler may read the query result. For example, the query result may include a result (e.g., a bit value in RES field 515) indicating whether a pending interrupt exists and a ready bit (e.g., Ready Bit 510 of FIG. 5). Based on the query result, the user handler may determine whether to yield a processing thread to the operating system as described herein.

Accordingly, for example, aspects of the process flow 900 prevent a cascading effect (illustrated in at FIG. 9B) in which one or more user handlers unnecessarily yield a thread to the operating system. Referring to the example of FIG. 9B, user handler 0 through user handler 2 respectively yield respective threads 0 through 2 to the operating system in response to a query result indicating one or more pending interrupts exists (e.g., a Pending Interrupt Count=1).

In the example of FIG. 9B, user handler 0 yields thread 0 to the operating system, and the operating system provides thread 0 to a handler 3 for processing a pending interrupt. However, thread 1 and thread 2 remain unused and idle, and user handler 1 and user handler 2 are unable to perform work due to returning thread 1 and thread 2 to the operating system.

Figure 10:
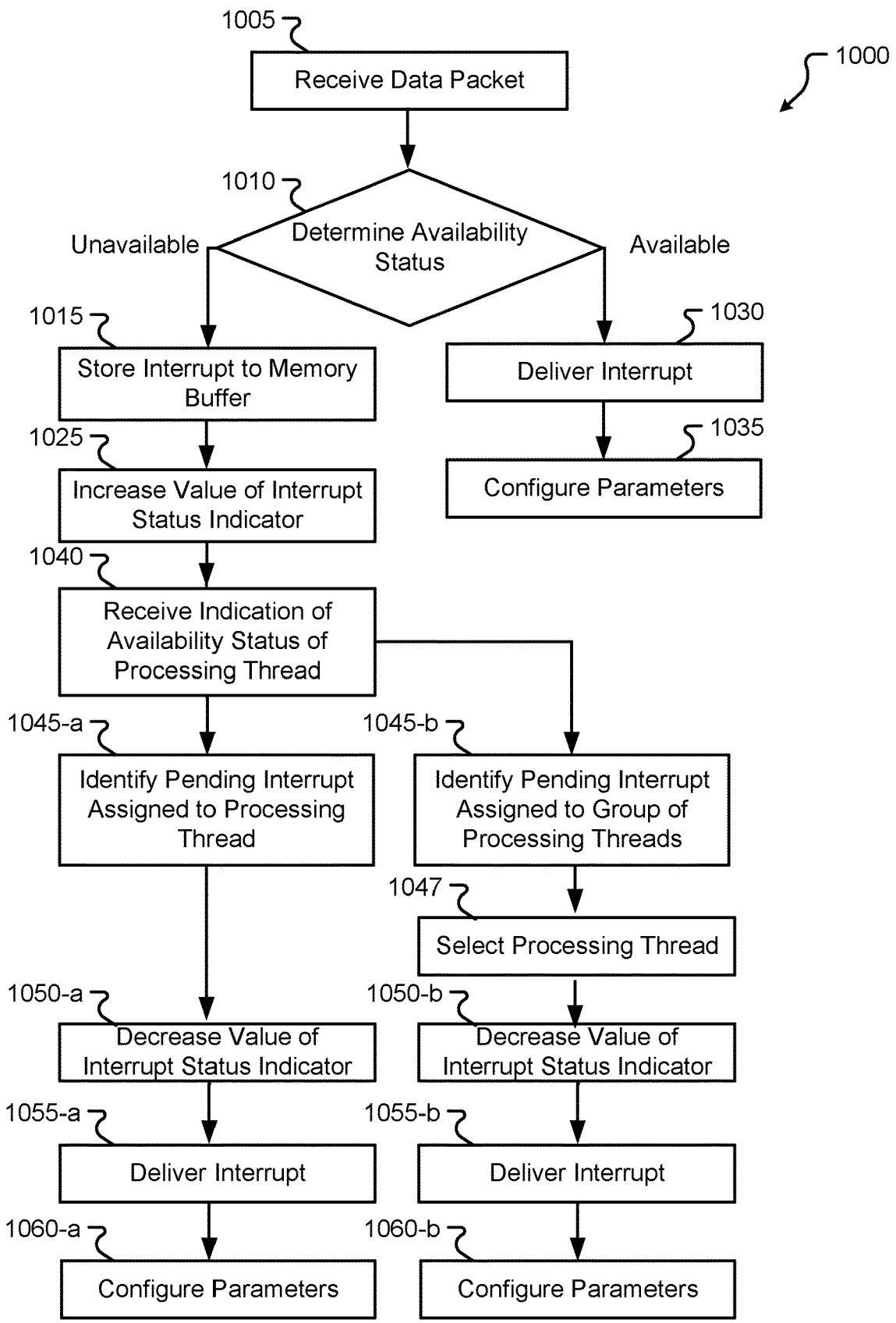
FIG. 10 illustrates an example of a process flow in accordance with aspects of the present disclosure.

FIG. 10 illustrates an example of a process flow 1000 that supports improving processor utilization in an event driven cooperatively scheduled environment, in accordance with aspects of the present disclosure.

In the following description of the process flow 1000, the operations may be performed in a different order than the order shown, or the operations may be performed in different orders or at different times. Certain operations may also be left out of the process flow 1000, or other operations may be added to the process flow 1000.

It is to be understood that while a DPU 105 of a system 100 described herein may perform a number of the operations of process flow 1000, any device (e.g., another device, another DPU 105, one or more circuits of the DPU 105, scheduling engine 110, event handler 120, etc.) may perform the operations shown.

At 1005, the process flow 1000 may include receiving a data packet including an indication of an interrupt to be delivered.

At 1010, the process flow 1000 may include determining (e.g., by scheduling engine 110) an availability status of a processing thread.

At 1015, the process flow 1000 may include storing the interrupt to a memory buffer including the pending interrupts in response to the availability status indicating the processing thread is unavailable.

The process flow 1000 may include managing an interrupt status indicator in response to determining the availability status and/or storing the interrupt. In some aspects, a value of the interrupt status indicator corresponds to a quantity of pending interrupts. In an example, the interrupt status indicator may include a counter. Examples of managing the interrupt status indicator are later described with reference to 1025, 1050-a, and 1050-b of the process flow 1000.

For example, at 1025 of the process flow 1000, managing the interrupt status indicator may include increasing the value of the interrupt status indicator in response to the availability status indicating the processing thread is unavailable.

In some other aspects, at 1030, the process flow 1000 may include delivering the interrupt to the processing thread in response to the availability status indicating the processing thread is available. In an example implementation, the process flow 1000 may include delivering the interrupt to a first available processing thread or any available processing thread.

At 1035, the process flow 1000 may include configuring one or more parameters associated with an event handling circuit and the processing thread in association with processing the interrupt.

At 1040, the process flow 1000 may include receiving (e.g., by event handler 120) an indication of an availability status of the processing thread in association with processing one or more other interrupts.

Example aspects of the process flow 1000 that support a Hart Affinitized Mode are described herein:

At 1045-a, the process flow 1000 may include identifying, from among the pending interrupts, a pending interrupt assigned to the processing thread.

At 1050-a of the process flow 1000, managing the interrupt status indicator may include decreasing the value of the interrupt status indicator in response to identifying the pending interrupt.

The process flow 1000 may include, in response to identifying the pending interrupt and/or decreasing the value of the interrupt status indicator:

delivering (at 1055-a) the pending interrupt to the processing thread; and configuring (at 1060-a) one or more parameters associated with an event handling circuit and the processing thread in association with processing the pending interrupt.

Example aspects of the process flow 1000 that support a Hart Group Mode are described herein:

At 1045-b, the process flow 1000 may include identifying, from among the pending interrupts, a pending interrupt assigned to a group of processing threads that includes the processing thread.

At 1047, the process flow 1000 may include selecting, from among the group of processing threads: the processing thread; or another processing thread.

At 1050-b of the process flow 1000, managing the interrupt status indicator may include decreasing the value of the interrupt status indicator in response to selecting the processing thread or the other processing thread.

The process flow 1000 may include, in response to selecting the processing thread (or other processing thread) and/or decreasing the value of the interrupt status indicator:

delivering (at 1055-b) the pending interrupt to the processing thread (or other processing thread); and configuring (at 1060-b) one or more parameters associated with an event handling circuit and the processing thread (or other processing thread) in association with processing the pending interrupt.

Figure 11:
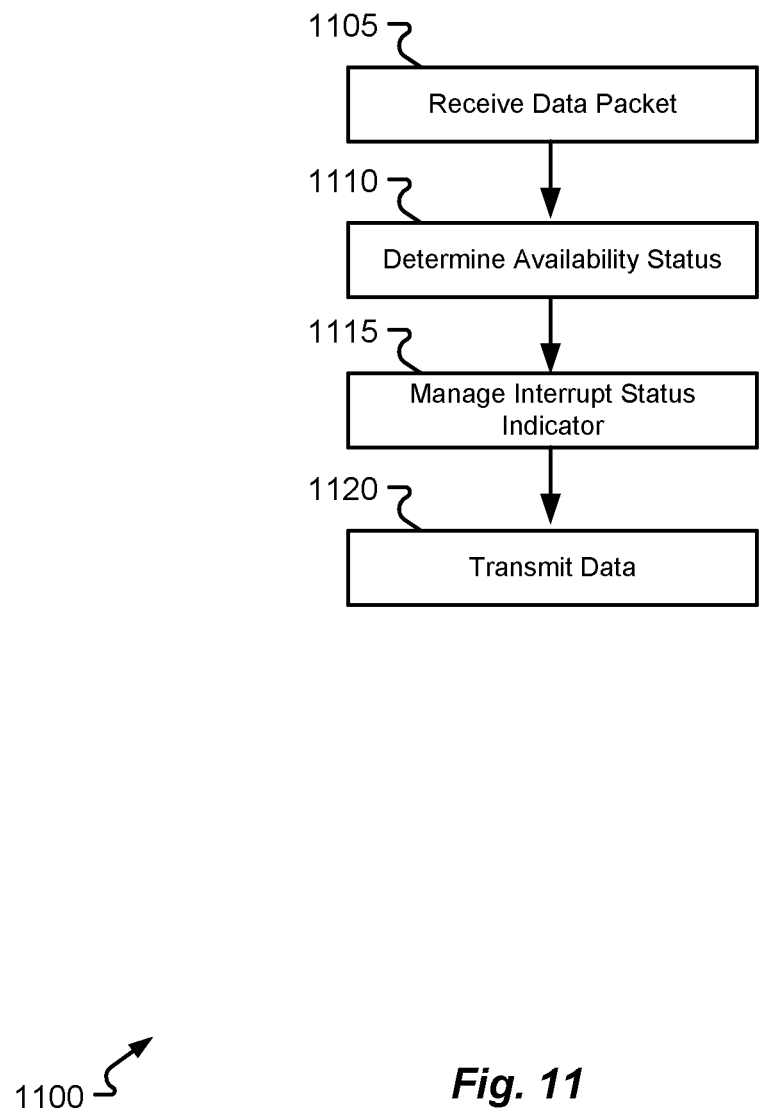
FIG. 11 illustrates an example of a process flow in accordance with aspects of the present disclosure.

FIG. 11 illustrates an example of a process flow 1100 that supports improving processor utilization in an event driven cooperatively scheduled environment, in accordance with aspects of the present disclosure.

In the following description of the process flow 1100, the operations may be performed in a different order than the order shown, or the operations may be performed in different orders or at different times. Certain operations may also be left out of the process flow 1100, or other operations may be added to the process flow 1100.

It is to be understood that while a DPU 105 of a system 100 described herein may perform a number of the operations of process flow 1100, any device (e.g., another device, another DPU 105, one or more circuits of the DPU 105, scheduling engine 110, etc.) may perform the operations shown.

At 1105, the process flow 1100 may include receiving a data packet including an indication of an interrupt to be delivered.

At 1110, the process flow 1100 may include determining an availability status of a processing thread.

At 1115, the process flow 1100 may include managing an interrupt status indicator in response to determining the availability status and/or storing the interrupt. In some aspects, a value of the interrupt status indicator corresponds to a quantity of pending interrupts. In an example, the interrupt status indicator may include a counter.

At 1120, the process flow 1100 may include transmitting data to an event handling circuit in response to a query from the event handling circuit. In some aspects, the data may include an indication of an existence or absence of the pending interrupts.

Figure 12:
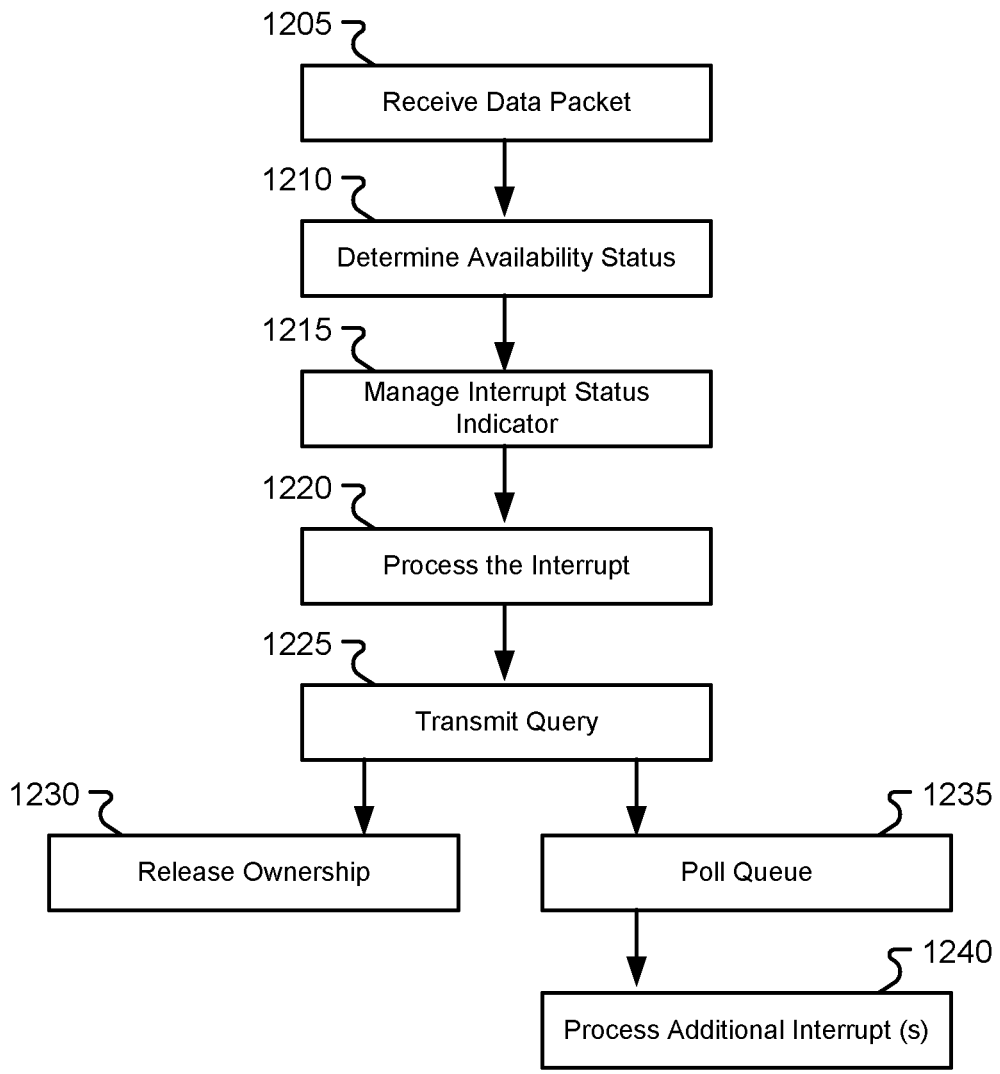
FIG. 12 illustrates an example of a process flow in accordance with aspects of the present disclosure.

FIG. 12 illustrates an example of a process flow 1200 that supports improving processor utilization in an event driven cooperatively scheduled environment, in accordance with aspects of the present disclosure.

In the following description of the process flow 1200, the operations may be performed in a different order than the order shown, or the operations may be performed in different orders or at different times. Certain operations may also be left out of the process flow 1200, or other operations may be added to the process flow 1200.

It is to be understood that while a DPU 105 of a system 100 described herein may perform a number of the operations of process flow 1200, any device (e.g., another device, another DPU 105, one or more circuits of the DPU 105, etc.) may perform the operations shown.

At 1205, the process flow 1200 may include receiving a data packet including an indication of an interrupt to be delivered.

At 1210, the process flow 1200 may include determining an availability status of a processing thread.

At 1215, the process flow 1200 may include managing an interrupt status indicator in response to determining the availability status and/or storing the interrupt. In some aspects, a value of the interrupt status indicator corresponds to a quantity of pending interrupts. In an example, the interrupt status indicator may include a counter.

At 1220, the process flow 1200 may include processing the interrupt using the processing thread.

At 1225, the process flow 1200 may include transmitting a query requesting an indication of an existence or absence of one or more additional interrupts.

At 1230, the process flow 1000 may include releasing ownership of the processing thread in response to a result of the query (e.g., in response to a result indicating an existence of one or more additional interrupts).

Additionally, or alternatively, at 1235, the process flow 1000 may include polling a queue for the one or more additional interrupts, in response to a result of the query (e.g., in response to a result indicating an absence of one or more additional interrupts).

At 1240, the process flow 1000 may include processing the one or more additional interrupts using the processing thread.

Figure 13:
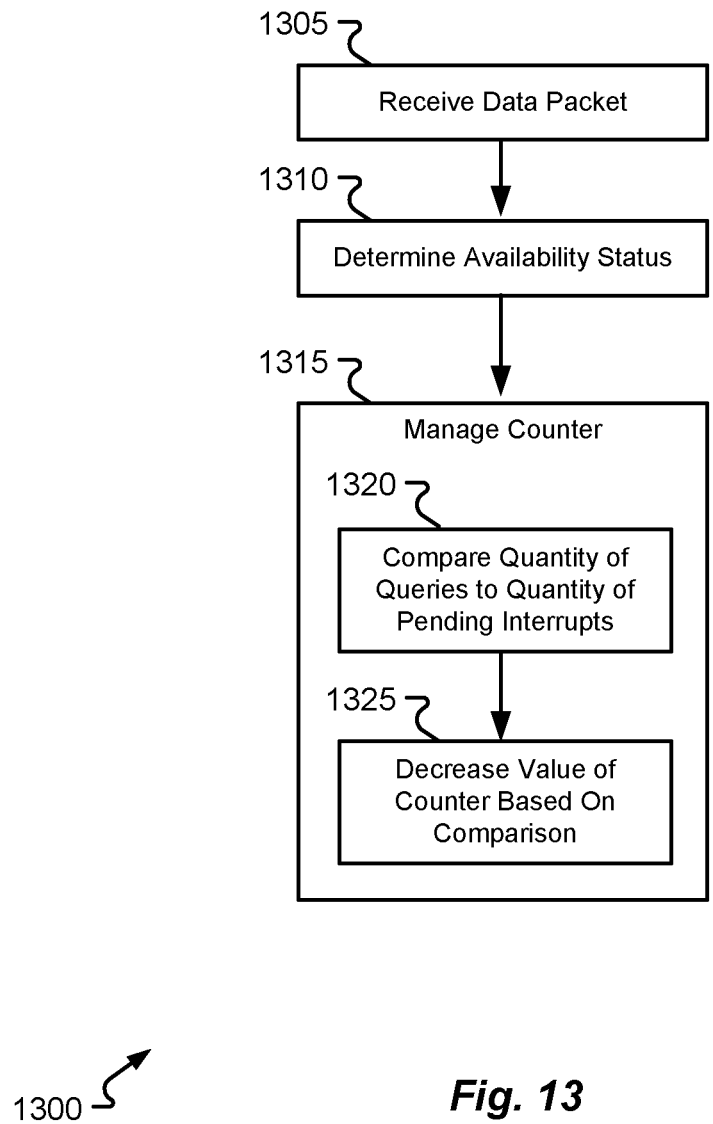
FIG. 13 illustrates an example of a process flow in accordance with aspects of the present disclosure.

FIG. 13 illustrates an example of a process flow 1300 that supports improving processor utilization in an event driven cooperatively scheduled environment, in accordance with aspects of the present disclosure.

In the following description of the process flow 1300, the operations may be performed in a different order than the order shown, or the operations may be performed in different orders or at different times. Certain operations may also be left out of the process flow 1300, or other operations may be added to the process flow 1300.

It is to be understood that while a DPU 105 of a system 100 described herein may perform a number of the operations of process flow 1300, any device (e.g., another device, another DPU 105, one or more circuits of the DPU 105, etc.) may perform the operations shown.

At 1305, the process flow 1300 may include receiving a data packet including an indication of an interrupt to be delivered.

At 1310, the process flow 1300 may include determining an availability status of a processing thread.

At 1315, the process flow 1300 may include managing an interrupt status indicator in response to determining the availability status. In some aspects, a value of the interrupt status indicator corresponds to a quantity of pending interrupts. In an example, the interrupt status indicator may include a counter.

At 1320, the process flow 1000 may include comparing the quantity of queries to the quantity of pending interrupts with respect to a temporal duration. In some aspects, the queries each include a request for an indication of an existence or absence of the pending interrupts.

At 1325, managing the interrupt status indicator may include decreasing the value of the interrupt status indicator based on a result of the comparison (e.g., a result indicating the quantity of queries is less than the quantity of pending interrupts).

Any of the steps, functions, and operations discussed herein can be performed continuously and automatically.

The exemplary apparatuses, systems, and methods of this disclosure have been described in relation to examples of a DPU 105 and a server 165. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects. For example, the operations described herein may be performed in different orders than the orders shown or at different times. Certain operations may also be left out of the example process flows, or other operations may be added to the example process flows.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, computer system 700 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a data processing unit ("DPU") and a graphics processing unit ("GPU") execute other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU, a DPU, or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
   one or more circuits to manage scheduling of interrupts by:
      receiving a data packet comprising an indication of an interrupt to be delivered;
      determining an availability status of a processing thread; and
      managing an interrupt status indicator in response to determining the availability status, wherein a value of the interrupt status indicator corresponds to a quantity of pending interrupts,
   wherein managing the interrupt status indicator comprises increasing the value of the interrupt status indicator in response to the availability status indicating the processing thread is unavailable.

2. The apparatus of claim 1, wherein managing the interrupt status indicator comprises:
   decreasing the value of the interrupt status indicator in response to the processing thread processing a pending interrupt.

3. The apparatus of claim 1, wherein the one or more circuits are further to:
   store the interrupt to a memory buffer comprising the pending interrupts in response to the availability status indicating the processing thread is unavailable.

4. The apparatus of claim 1, wherein the one or more circuits are further to:
   deliver the interrupt to the processing thread in response to the availability status indicating the processing thread is available; and
   configure one or more parameters associated with an event handling circuit and the processing thread in association with processing the interrupt.

5. The apparatus of claim 1, wherein the one or more circuits are further to:
   receive an indication of an availability status of the processing thread in association with processing one or more other interrupts; and
   identify, from among the pending interrupts, a pending interrupt assigned to the processing thread,
   wherein managing the interrupt status indicator comprises decreasing the value of the interrupt status indicator in response to identifying the pending interrupt.

6. The apparatus of claim 5, wherein the one or more circuits are further to, in response to identifying the pending interrupt:
   deliver the pending interrupt to the processing thread; and
   configure one or more parameters associated with an event handling circuit and the processing thread in association with processing the pending interrupt.

7. The apparatus of claim 1, wherein the one or more circuits are further to:
   receive an indication of an availability status of the processing thread in association with processing one or more other interrupts;
   identify, from among the pending interrupts, a pending interrupt assigned to a group of processing threads that includes the processing thread; and
   selecting, from among the group of processing threads:
      the processing thread; or
      another processing thread, wherein managing the interrupt status indicator comprises decreasing the value of the interrupt status indicator in response to selecting the processing thread or the another processing thread.

8. The apparatus of claim 1, wherein the one or more circuits are further to:
transmit data to an event handling circuit in response to a query from the event handling circuit, wherein the data comprises an indication of an existence or absence of the pending interrupts.

9. The apparatus of claim 1, wherein the one or more circuits are further to:
process the interrupt using the processing thread;
transmit a query requesting an indication of an existence or absence of one or more additional interrupts; and
release ownership of the processing thread in response to a result of the query.

10. The apparatus of claim 1, wherein the one or more circuits are further to:
process the interrupt using the processing thread;
transmit a query requesting an indication of an existence or absence of one or more additional interrupts;
poll a queue for the one or more additional interrupts, in response to a result of the query; and
process the one or more additional interrupts using the processing thread.

11. The apparatus of claim 1, wherein the one or more circuits are further to:
compare a quantity of queries to a quantity of pending interrupts with respect to a temporal duration, wherein the queries each comprise a request for an indication of an existence or absence of the pending interrupts,
wherein managing the interrupt status indicator comprises decreasing the value of the interrupt status indicator based on a result of the comparison.

12. The apparatus of claim 1, wherein the interrupt status indicator comprises a counter.

13. A system comprising:
a hardware scheduling circuit to manage scheduling of interrupts by:
receiving a data packet comprising an indication of an interrupt to be delivered;
determining an availability status of a processing thread; and
managing an interrupt status indicator in response to determining the availability status, wherein a value of the interrupt status indicator corresponds to a quantity of pending interrupts, and wherein managing the interrupt status indicator comprises increasing the value of the interrupt status indicator in response to the availability status indicating the processing thread is unavailable; and
an event handling circuit to process, using the processing thread, at least one of:
the interrupt; and
one or more of the pending interrupts.

14. The system of claim 13, wherein managing the interrupt status indicator comprises:
decreasing the value of the interrupt status indicator in response to the processing thread processing a pending interrupt.

15. The system of claim 13, wherein the hardware scheduling circuit is further to:
store the interrupt to a memory buffer comprising the pending interrupts, in response to the availability status indicating the processing thread is unavailable.

16. The system of claim 13, wherein the hardware scheduling circuit is further to:
deliver the interrupt to the processing thread, in response to the availability status indicating the processing thread is available; and
configure one or more parameters associated with the event handling circuit and the processing thread in association with processing the interrupt.

17. The system of claim 13, wherein the hardware scheduling circuit is further to:
receive an indication of an availability status of the processing thread in association with processing one or more other interrupts; and
identify, from among the pending interrupts, a pending interrupt assigned to the processing thread,
wherein managing the interrupt status indicator comprises decreasing the value of the interrupt status indicator in response to identifying the pending interrupt.

18. The system of claim 17, wherein, in response to identifying the pending interrupt, the hardware scheduling circuit is to:
deliver the pending interrupt to the processing thread; and
configure one or more parameters associated with the event handling circuit and the processing thread in association with processing the pending interrupt.

19. The system of claim 13, wherein the hardware scheduling circuit is further to:
transmit data to the event handling circuit in response to a query from the event handling circuit, wherein the data comprises an indication of an existence or absence of the pending interrupts.

20. The system of claim 13, wherein the event handling circuit is further to:
process the interrupt using the processing thread;
transmit a query requesting an indication of an existence or absence of one or more additional interrupts; and
release ownership of the processing thread in response to a result of the query.

21. The system of claim 13, wherein the interrupt status indicator comprises a counter.

22. A method comprising:
receiving a data packet comprising an indication of an interrupt to be delivered;
determining an availability status of a processing thread in association with processing the interrupt; and
managing an interrupt status indicator and the processing of the interrupt in response to determining the availability status, wherein a value of the interrupt status indicator corresponds to a quantity of pending interrupts, and wherein managing the interrupt status indicator comprises increasing the value of the interrupt status indicator in response to the availability status indicating the processing thread is unavailable.

* * * * *